US012370553B2

(12) United States Patent
Kimbell

(10) Patent No.: US 12,370,553 B2
(45) Date of Patent: Jul. 29, 2025

(54) PROCESSING MACHINE

(71) Applicant: Bandit Industries, Inc., Remus, MI (US)

(72) Inventor: Kyle Douglas Kimbell, Vestaburg, MI (US)

(73) Assignee: Bandit Industries, Inc., Remus, MI (US)

( * ) Notice: Subject to any disclaimer, the term of this patent is extended or adjusted under 35 U.S.C. 154(b) by 0 days.

(21) Appl. No.: 18/858,792

(22) PCT Filed: Apr. 24, 2023

(86) PCT No.: PCT/US2023/019554
§ 371 (c)(1),
(2) Date: Oct. 22, 2024

(87) PCT Pub. No.: WO2023/205493
PCT Pub. Date: Oct. 26, 2023

(65) Prior Publication Data

US 2025/0135464 A1 May 1, 2025

Related U.S. Application Data

(60) Provisional application No. 63/333,725, filed on Apr. 22, 2022.

(51) Int. Cl.
*B02C 18/20* (2006.01)

(52) U.S. Cl.
CPC .................................... *B02C 18/20* (2013.01)

(58) Field of Classification Search
CPC ..... B02C 18/145; B02C 18/184; B27G 13/04; B27G 13/10
See application file for complete search history.

(56) References Cited

U.S. PATENT DOCUMENTS

| | | | |
|---|---|---|---|
| 5,322,351 | A | 6/1994 | Lent |
| 5,350,122 | A | 9/1994 | Hundt et al. |

(Continued)

FOREIGN PATENT DOCUMENTS

| | | | |
|---|---|---|---|
| CN | 106650146 | B | 10/2019 |
| CN | 213434878 | U | 6/2021 |
| WO | 2014071173 | A2 | 5/2014 |

OTHER PUBLICATIONS

English language abstract for CN 106650146 B extracted from espacenet.com database on Jul. 5, 2023, 1 page.

(Continued)

*Primary Examiner* — Matthew Katcoff
(74) *Attorney, Agent, or Firm* — Howard & Howard Attorneys PLLC

(57) ABSTRACT

A processing machine includes an infeed system, a processing tool assembly, and a discharge system. The processing machine includes a rotor defining an outer surface, with the processing tool assembly at least partially mounted to the rotor. The processing tool assembly includes a tool holder mounted to the outer surface of the rotor with the tool holder having a pocket structure defining an inner cavity. The processing tool assembly also includes a tool body having a tool retention portion and a tooth holding portion with the tool retention portion disposed within the inner cavity of the pocket structure. The processing tool assembly also includes a processing tool mounted to the tooth holding portion, and a retaining plate secured to the tool holder and abutting a portion of the tool body such that the tool retention portion of the tool body is retained within the pocket structure.

25 Claims, 21 Drawing Sheets

(56) References Cited

U.S. PATENT DOCUMENTS

| | | | |
|---|---|---|---|
| 5,941,467 | A | 8/1999 | McArdle et al. |
| 5,975,443 | A | 11/1999 | Hundt et al. |
| 6,207,228 | B1 | 3/2001 | Hundt et al. |
| 6,394,378 | B1 | 5/2002 | Ragnarsson |
| 6,422,495 | B1 | 7/2002 | De Boef et al. |
| 6,464,157 | B1 | 10/2002 | Balvanz et al. |
| 6,520,440 | B2 | 2/2003 | Ragnarsson |
| 6,523,768 | B2 | 2/2003 | Recker et al. |
| 6,742,732 | B1 | 6/2004 | Hundt et al. |
| 6,776,198 | B1 | 8/2004 | Haines et al. |
| 6,840,471 | B2 | 1/2005 | Roozeboom et al. |
| 6,880,774 | B2 | 4/2005 | Bardos et al. |
| 7,055,770 | B2 | 6/2006 | Bardos |
| 7,293,729 | B2 | 11/2007 | Ragnarsson |
| 7,325,759 | B2 | 2/2008 | Meyer |
| 7,384,011 | B1 | 6/2008 | Smith |
| 7,611,085 | B2 | 11/2009 | Mcintyre et al. |
| 7,624,490 | B2 | 12/2009 | Bardos |
| D608,374 | S | 1/2010 | De Rycke et al. |
| 7,726,594 | B2 | 6/2010 | Smith |
| D635,154 | S | 3/2011 | Rummer et al. |
| D635,593 | S | 4/2011 | Berning et al. |
| 7,946,513 | B2 | 5/2011 | Brick et al. |
| 8,066,213 | B2 | 11/2011 | Marquardsen |
| 8,113,453 | B2 | 2/2012 | Bardos |
| D719,988 | S | 12/2014 | Runquist et al. |
| 9,021,679 | B2 | 5/2015 | Roozeboom |
| 9,468,928 | B2 | 10/2016 | Emmerich et al. |
| 9,604,227 | B2 | 3/2017 | Lieser et al. |
| 9,675,976 | B2 | 6/2017 | Roozeboom et al. |
| 9,820,422 | B2 | 11/2017 | Campey et al. |
| 9,844,894 | B2 | 12/2017 | Schlief |
| 9,866,089 | B2 | 1/2018 | Brick et al. |
| 10,045,472 | B2 | 8/2018 | Campey et al. |
| 10,260,206 | B2 | 4/2019 | Latham |
| D847,867 | S | 5/2019 | Zabe et al. |
| 10,440,875 | B2 | 10/2019 | Campey et al. |
| 10,458,128 | B2 | 10/2019 | Cook et al. |
| 10,787,774 | B2 | 9/2020 | Latham |
| D913,339 | S | 3/2021 | De Gersem et al. |
| 11,110,467 | B2 | 9/2021 | Kimbell et al. |
| D944,116 | S | 2/2022 | Zamorano Jones et al. |
| 2001/0045748 | A1 | 11/2001 | Muto |
| 2003/0116665 | A1 | 6/2003 | Ragnarsson |
| 2005/0035234 | A1 | 2/2005 | Roozeboom et al. |
| 2010/0155513 | A1 | 6/2010 | Brick et al. |
| 2011/0226880 | A1 | 9/2011 | Marquardsen |
| 2012/0018560 | A1 | 1/2012 | Denis et al. |
| 2015/0069160 | A1 | 3/2015 | Roozeboom et al. |
| 2015/0375233 | A1 | 12/2015 | Daining et al. |
| 2017/0073982 | A1 | 3/2017 | Cook et al. |
| 2017/0080594 | A1 | 3/2017 | DiSabatino |
| 2017/0143027 | A1 | 5/2017 | Lieser et al. |
| 2018/0161779 | A1 | 6/2018 | Kimbell et al. |
| 2018/0229244 | A1 | 8/2018 | Kimbell et al. |
| 2020/0128868 | A1 | 4/2020 | Lieser et al. |
| 2024/0229904 | A1 | 7/2024 | Baxter |

OTHER PUBLICATIONS

Written Opinion and International Search Report for International Application No. PCT/US2023/019554 mailed Jul. 17, 2023, 7 pages.

Supplementary European Search Report for Application EP 23 79 2624 dated May 22, 2025, 2 pages.

English language abstract for CN 213434878 U extracted from espacenet.com database on Jun. 2, 2025, 1 page.

PROCESSING MACHINE

CROSS-REFERENCE TO RELATED APPLICATIONS

The subject patent application is the National Phase of International Application No. PCT/US2023/019554, filed on Apr. 24, 2023, which claims priority to and all of the benefits of U.S. Provisional Patent Application No. 63/333,725, filed on Apr. 22, 2022, the disclosures of which are hereby incorporated by reference.

BACKGROUND

A variety of machines have been developed to chip, cut, grind, or otherwise reduce waste materials such as wood, brush, and green waste. Exemplary material processing machines (i.e., processing machines) include chippers (disk and drum types), hammer mills, hogs, shredders, forestry mulchers, and the like. The machines typically include an infeed system, a reducing system, and a discharge system. The infeed system directs the waste material to the reducing system and the material reducing system reduces the same, after which the reduced waste material is discharged via the discharge system.

Improvements are desired in the methods and systems used for cutting the waste material. Therefore, there is a need in the art to provide improved processing machines and associated methods of use.

SUMMARY OF THE PRESENT DISCLOSURE

The aforementioned drawbacks and disadvantages of these former processing machines have been identified and solutions are set forth herein.

The processing machine includes a rotor defining an outer surface. A processing tool assembly is at least partially mounted to the rotor. The processing tool assembly includes a tool holder mounted to the outer surface of the rotor with the tool holder having a pocket structure defining an inner cavity. The processing tool assembly also includes a tool body having a tool retention portion and a tooth holding portion extending from the tool retention portion with the tool retention portion disposed within the inner cavity of the pocket structure. The processing tool assembly also includes a waste processing tool mounted to the tooth holding portion, and a retaining plate secured to the tool holder and abutting a portion of the tool body such that the tool retention portion of the tool body is retained within the pocket structure.

In certain embodiments, the tool retention portion of the tool body includes a front abutment surface and a rear abutment surface with the tooth holding portion extending between the front and rear abutment surfaces, and with the retaining plate engaging the front and rear abutment surfaces to retain the tool body within the tool holder. In certain of these embodiments, the tool body also includes an intermediate angled surface extending between the front abutment surface and the tooth holding portion.

In certain embodiments, the pocket structure includes a bucket and a ledge extending from the bucket with the ledge secured to the outer surface of the rotor below the outer surface of the rotor. In certain of these embodiments, a first one of the bucket and the tool retention portion of the tool body defines a slot (or in alternative embodiments more than one slot), and wherein a second one of the bucket and the tool retention portion includes a tab (and in certain embodiments more than one tab), and wherein one tab is inserted within a corresponding one slot when the tool retention portion is retained to the pocket structure.

The present disclosure also provides for the processing machine including an infeed system and a discharge system with the processing tool assembly as described above operatively coupled to and between the infeed system and the discharge system.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
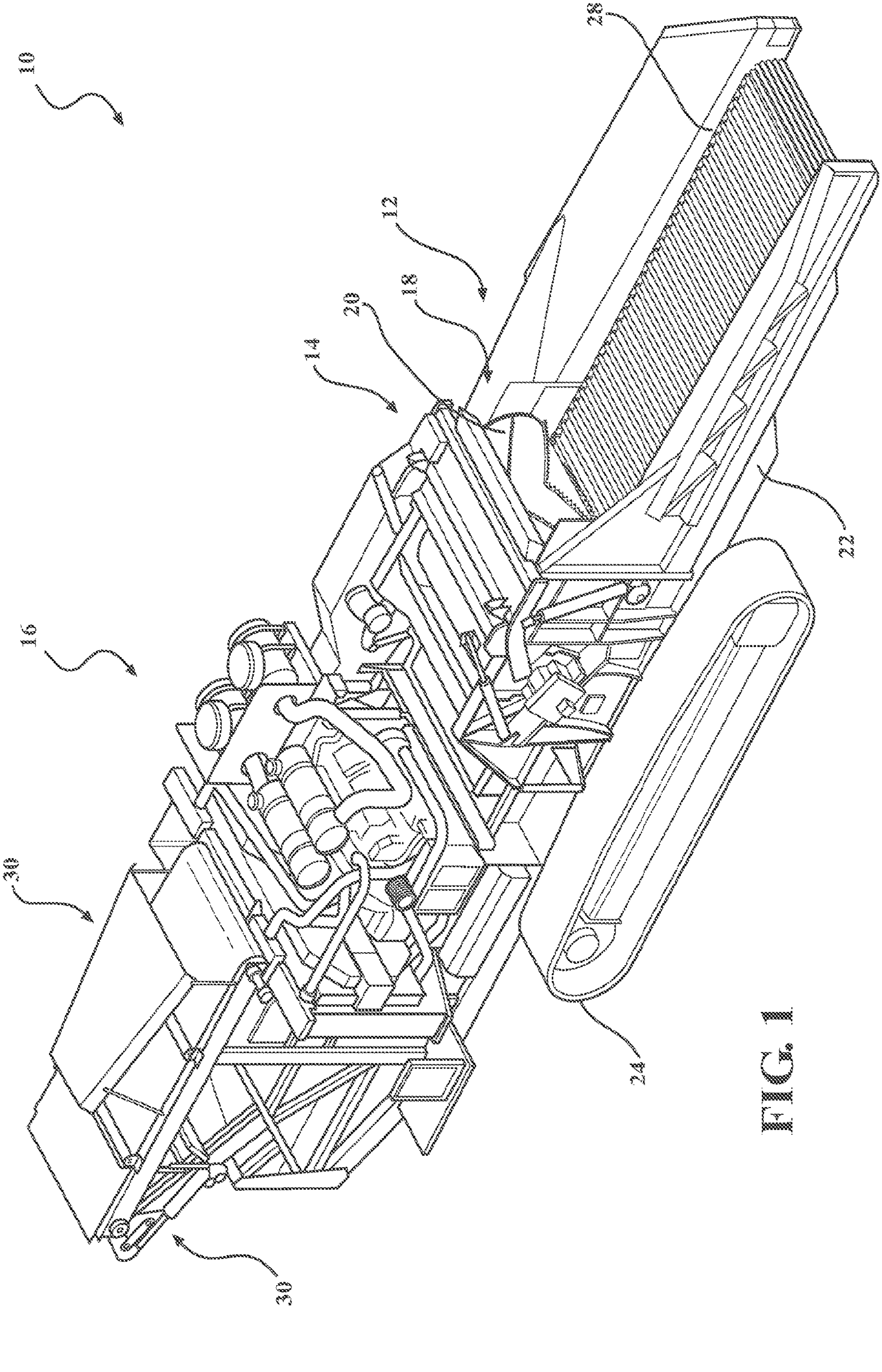
FIG. 1 is a perspective view of a material processing machine in accordance with an exemplary embodiment of the present disclosure.

FIG. 1 illustrates an exemplary processing machine 10 (sometimes alternatively referred to herein as a material processing machine 10) including an infeed system 12, a reducing system 14 operatively coupled to the infeed system 12, and a discharge system 16 operatively coupled to the reducing system 14. Waste material enters the material processing machine 10 through the infeed system 12 where it is directed to the reducing system 14. The reducing system 14 reduces the waste after which the discharge system 16 expels the waste from the material processing machine 10.

Referring to FIG. 1, the infeed system 12 includes a feed wheel assembly 18. The feed wheel assembly 18 includes one or more feed wheels 20 rotatably mounted to a suitable structure of the infeed system 12. The feed wheels 20 are configured to move the waste material to the reducing system 14. Subsequent to material reduction, the waste material is directed to the discharge system 16 and discharged from the material processing machine 10.

The material processing machine 10 is typically known as a horizontal grinder and supported on a frame 22. As shown, the frame 22 has opposing tracks 24 for propelling the machine 10. An exemplary frame 22 may comprise ¼" thick steel with 20" deep formed high tensile steel plating and cross-section bracing using continuous welds for structural integrity. In the exemplary embodiment illustrated in FIG. 1, the infeed system 12, the reducing system 14, and/or the discharge system 16 may be transported together on a singular frame 22. Alternatively, these systems can be installed on a trailer or propelled in any suitable manner.

The infeed system 12 includes a feed conveyor 28 configured to receive the waste material proximate and direct the waste material towards the feed wheel 20. The feed conveyor 28 and the feed wheel 20 may cooperatively direct the material through an inlet opening 35 towards the reducing system 14. The feed wheel 20 may be internally driven and floating with a diameter of 24" (i.e., 24 inches) and a width of 60". An exemplary feed conveyor 28 may include a double slat track-type design configured to direct material at twenty feet per minute. The feed conveyor 28 may have a length of 13 feet 6 inches and a width of 60 inches. Other dimensional and operating characteristics of the feed wheel 20 and the feed conveyor 28 are contemplated. The discharge system 16 may include a discharge conveyor 30 illustrated in FIG. 1.

Figure 2:
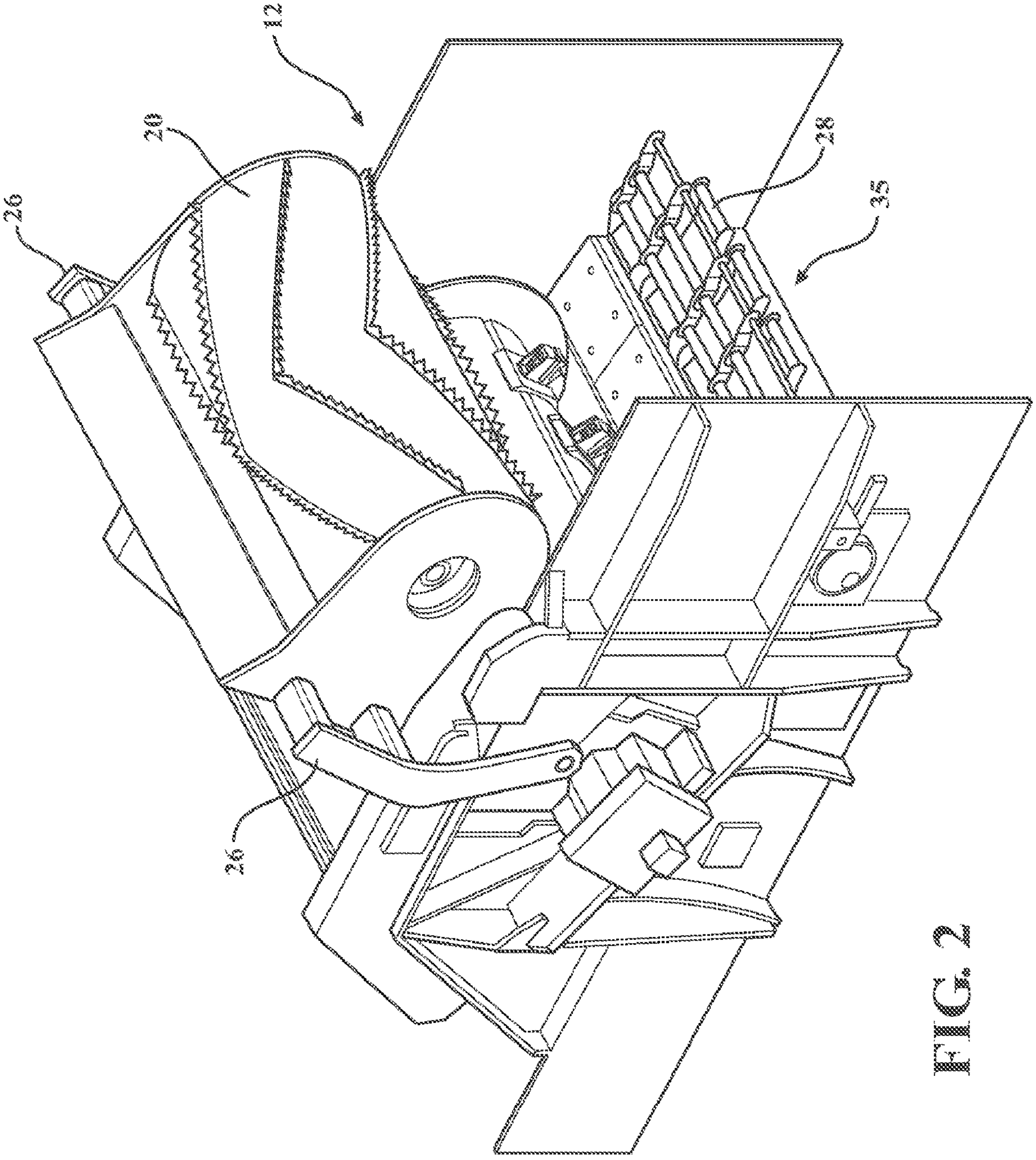
FIG. 2 is a partial perspective view of the material processing machine of FIG. 1 showing portions of an infeed system and a reducing system.

FIG. 2 is a partial perspective view of FIG. 1 illustrating portions of the infeed system 12 and the reducing system 14 supported by the frame 22 of the material processing machine 10. The feed wheel 20 of the infeed system 12 is rotatably mounted to the lower end of a pair of support arms 26 configured to raise and lower the feed wheel 20 with respect to the feed conveyor 28. The space between the feed conveyor 28 and the feed wheel 20 may generally define the inlet opening 35. FIG. 2 shows the support arms 26 and the feed wheel 20 articulated or pivoted to a generally elevated position thereby providing a relatively larger inlet opening 35 of the infeed system 12. The support arms 26 may be articulated or pivoted to the generally elevated position for inspecting the reducing system 14, for storing the processing machine 10, or for accommodating relatively larger material such as a tree trunk. The articulation of the support arms 26 is selectively controlled to position the feed wheel 20 at a desired elevation relative to the feed conveyor 28 to control the size of the inlet opening 35. The articulation may be powered by hydraulic cylinders adapted to permit an operator to raise the feed wheel 20 with respect to the feed conveyor 28 through means well understood in the art. The hydraulic cylinders may provide for automatic leveling of the feed wheel 20 if it begins to bind as a result of misalignment of the feed wheel 20 relative to the feed conveyor 28.

Figure 3:
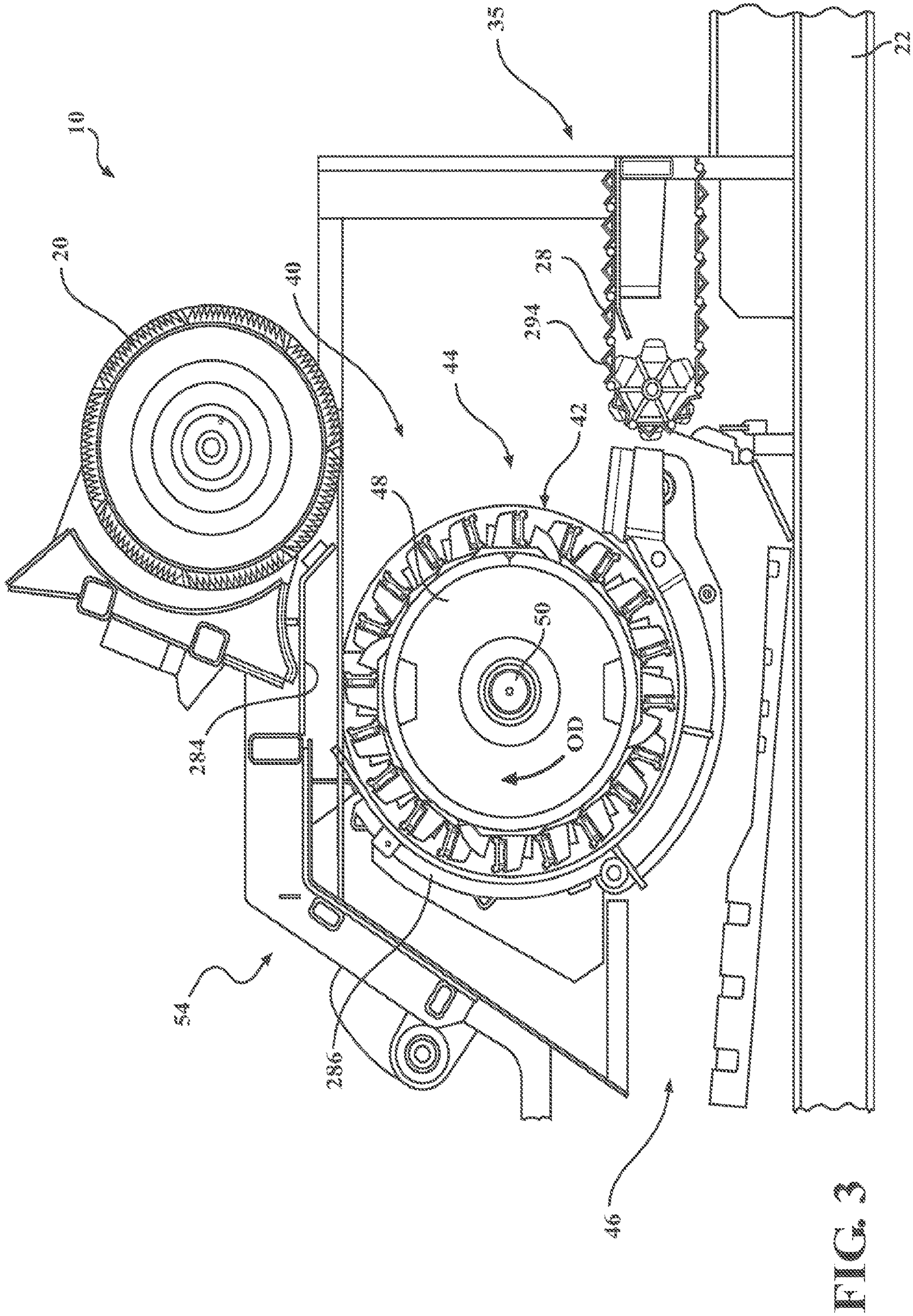
FIG. 3 is a partial cross sectional view of the material processing machine of FIG. 1.
Figure 4:
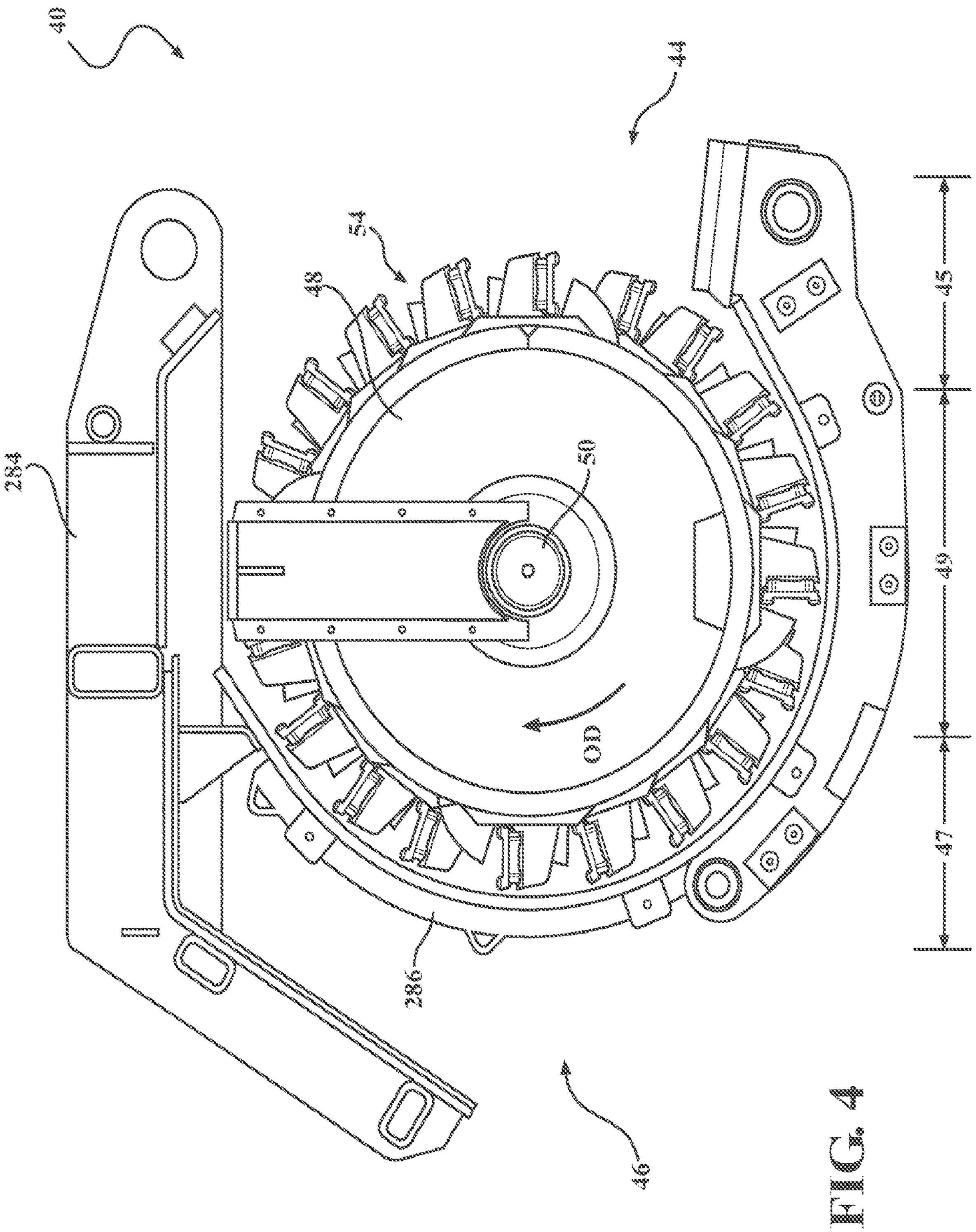
FIG. 4 is cross sectional side elevation view of a reducing chamber of the material processing machine of FIG. 1.

One or more motors operably power the feed conveyor 28 in a generally clockwise direction or counterclockwise direction to move the waste material disposed thereon towards the reducing system 14. As best shown in FIGS. 3 and 4, the reducing system 14 includes a reducing chamber 40 generally defined as an area of the material processing machine 10 within which material is reduced. In the exemplary embodiment illustrated in FIG. 3, the reducing chamber 40 is a partially cylindrical area housing a material reducing system 42 described herein.

Referring to FIGS. 3 and 4, the reducing chamber 40 includes an inlet area 44 and an outlet area 46. The inlet area 44 is generally defined as the area or opening through which the waste material enters the reducing chamber 40 from the infeed system 12. The inlet area 44 of the reducing chamber 40 generally corresponds to the inlet opening 35 of the infeed system 11 such that waste material directed into the inlet opening 35 is further directed into the inlet area 44. Stated differently, the reducing chamber 40 may comprise an inlet zone 45, an outlet zone 47, and a transition zone 49 intermediate the inlet zone 45 and the outlet zone 47. FIG. 4 illustrates the inlet, outlet, and transition zones 45, 47, 49. The inlet zone 45 may comprise the inlet area 44, and the outlet zone 47 may comprise the outlet area 46.

An exemplary material reducing system 42 will now be described with reference to FIGS. 3-6, and particularly in FIG. 6. The material reducing system 42 includes a rotor 48 having a shaft 50 rotatably mounted at its ends about longitudinal axis L. The rotor 48 is coupled to the frame 22. The rotor 48 has a drum 51 both define an outer surface 52 coaxially disposed with the shaft 50. An exemplary drum 51 may comprise a diameter of 48 inches and a width of 63 inches. For material processing machines 10 with more demanding operating conditions, the drum 51 may comprise a larger diameter and be of a greater or lesser width. A motor is connected to the shaft 50 in a well-known manner and adapted to turn the shaft 50 and the rotor 48 in an operation direction OD (see FIGS. 3 and 4), or the direction in which the rotor 48 and shaft 50 rotates.

The material reducing system 42 also has a plurality of processing tool assemblies 54 extending radially outwardly from the outer surface 52 of the drum 51. The processing tool assemblies 54 each comprise a tool holder 56 configured to be positioned along the outer surface 52 of the drum 51, with a portion of these tool holders 56 extending within an opening (shown in phantom by 53 in FIG. 6) in the outer surface 52 of the drum 51. The material reducing system 42 may comprise forty-two, fifty-four, sixty, seventy-two, or any number of processing tool assemblies 54 that are randomly or systematically positioned along, and extending within, the outer surface 52 of the drum 51. The drum 51 of the rotor 48 thus may define a rotor cavity 55 extending radially inwardly from the opening 53 which is partially defined by the opening 53.

The processing tool assembly 54 is shown in FIGS. 7-16 and includes, as its major components, the tool holder 56, a tool body 100, a retaining plate 150, and a waste processing tool 58. One or more fasteners 121, such as a plurality of fasteners 121, secure the retaining plate 150 about a pocket structure 60 of the tool holder 56 such that the tool body 100 is retained between the retaining plate 150 and the pocket structure 60 in the assembled state (see FIG. 7), as will be described further below. The tool holder 56 is configured to be disposed within the opening 53 in the outer surface 52 of the drum 51 and rotor 48.

The waste processing tool 58 includes a replaceable tooth assembly 170 that is mounted to the tool body 100 using one or more fasteners 125. The waste processing tool 58 can also include a guide member 190, or raker 190, that is coupled to the retaining plate 150 and extends over a portion of the outer surface 52 of the drum 51 and rotor 48. Each respective tooth assembly 170 is configured to cut, split, chop, chip, grind, or otherwise reduce the waste material provided to the reducing system 14 by the infeed system 12. Each guide member 190 is positioned forward of the replaceable tooth assembly 170 relative to the direction of rotation of the drum 51 and functions to lift the waste material in a direction away from the outer surface 52 of the drum 51 and rotor 48 prior to contacting the respective tooth assembly 170.

The tool holder 56 has a pocket structure 60 and includes a bucket 62 and a ledge 72 extending from the bucket 62. A pair of spaced apart runners 74 extend transverse to an upper surface 75 of the ledge 72 opposite the bucket 62 (i.e., the bucket 62 extends transverse from a lower side 73 of the ledge 72). The bucket 62, ledge 72, and runners 74 are preferably integrally formed such as shown in FIGS. 7-16 but could be separate components fastened together such as through welding, soldering or the like.

The bucket 62 includes a first bucket side 64, an opposing second bucket side 66, a pair of opposing connecting bucket sides 68, 70 and a bottom 71. Each of the respective bucket sides 64, 66, 68, 70 include a respective inward surface 82, 90, 86, that extends between the bottom 71 and the ledge 72. The dimensions of the outer surface of the respective bucket sides 64, 66, 68, 70 is configured to be received within a respective opening 53 in the outer surface 52 of the drum 51 and positioned or otherwise seated within the rotor cavity 55 and with the lower surface 73 of the ledge 72 positioned around the opening 53 and seated onto the outer surface 52 of the drum 51 and rotor 48.

In each of the embodiments shown, the inward surface 86, 88 of each of the pair of opposing connecting bucket sides 68, 70 is angled inward towards one another in a direction extending downward from the ledge 72 to the bottom 71 (i.e., the opposing connecting bucket sides 68, 70 have an inward angled surface). Accordingly, the distance between the inward surfaces 86, 88 decreases in a direction towards the bottom 71 and is minimized at the bottom 71. By contrast, in the embodiments shown, the inward surface 82, 90 of each of the front and second bucket sides 64, 66 are not angled inward towards one another in a direction extending downward from the ledge 72 to the bottom 71. Accordingly, the distance between the inward surfaces 82, 90 remains constant between the ledge and the bottom 71. Alternatively, the various sides and surfaces could be angled differently to accomplish a similar goal of retaining the tool body within the pocket structure of the tool holder.

In certain embodiments, the tool holder 56 is affixed or otherwise secured to the drum 51 such as through welding or the like. In particular, in certain embodiments, the lower surface 73 of the ledge 72 is affixed or otherwise secured to the outer surface 52 of the drum 51, such as through welding or the like, while the bucket 62 is positioned within the rotor cavity 55. Preferably, the lower surface 73 of the ledge 72 is chamfered (i.e., the lower side 73 of the ledge 72 is a chamfered surface), with the arc of the chamfer corresponding to the arc of the outer surface 52 of the drum 51. In certain embodiments, the bucket 62 may also be affixed to the portion of the drum 51 extending radially inward from the opening 53 such as a surface of the drum 51 further defining the rotor cavity 55.

In certain embodiments, one or more of the inward surfaces 82, 90, 86 and 88 defines one or more slots (shown as slots 84 and 92 in FIGS. 8 and 9). The respective slots 84, 92 extend from the ledge 72 and terminate at a position spaced from the bottom 71. In certain alternative embodiments, the respective slots 84, 92 may extend to the bottom 71 of the tool holder 56.

As shown in the exemplary embodiments of FIGS. 8A-9A, 8B-9B, and 8C-9C, the inward surface 82 of the first bucket side 64 defines one or more slots 84 (shown for example in FIGS. 8A-9A and FIGS. 8B-9B a single slot 84, and shown in FIG. 8C-9C as a pair of slots 84), while the inward surface 90 of the second bucket side 66 also defines one or more slots 92 (shown for example in FIGS. 8A-9A and FIGS. 8B-9B as a single slot 92, and shown in FIG. 9C FIG. 8C-9C as a pair of slots 92). The respective slots 84, 92 extend from the ledge 72 and terminate at a position spaced from the bottom 71. In certain alternative embodiments, the respective slots 84, 92 may extend to the bottom 71.

The width of the respective slots 84, 92, measured between the respective side surfaces 84A and 84B or 92A and 92B in a direction generally parallel to planes defining the ledge 72 and the bottom 71, is configured to be maximized at a location closest to the ledge 72. In certain embodiments, as in FIGS. 8A-9A and in FIGS. 8C-9C, the width of these slots 84, 92 is constant in a direction towards the bottom 71 such that it is the same width at a position closest to the bottom 71 as it is at a position adjacent to the ledge 72.

Figure 8A:
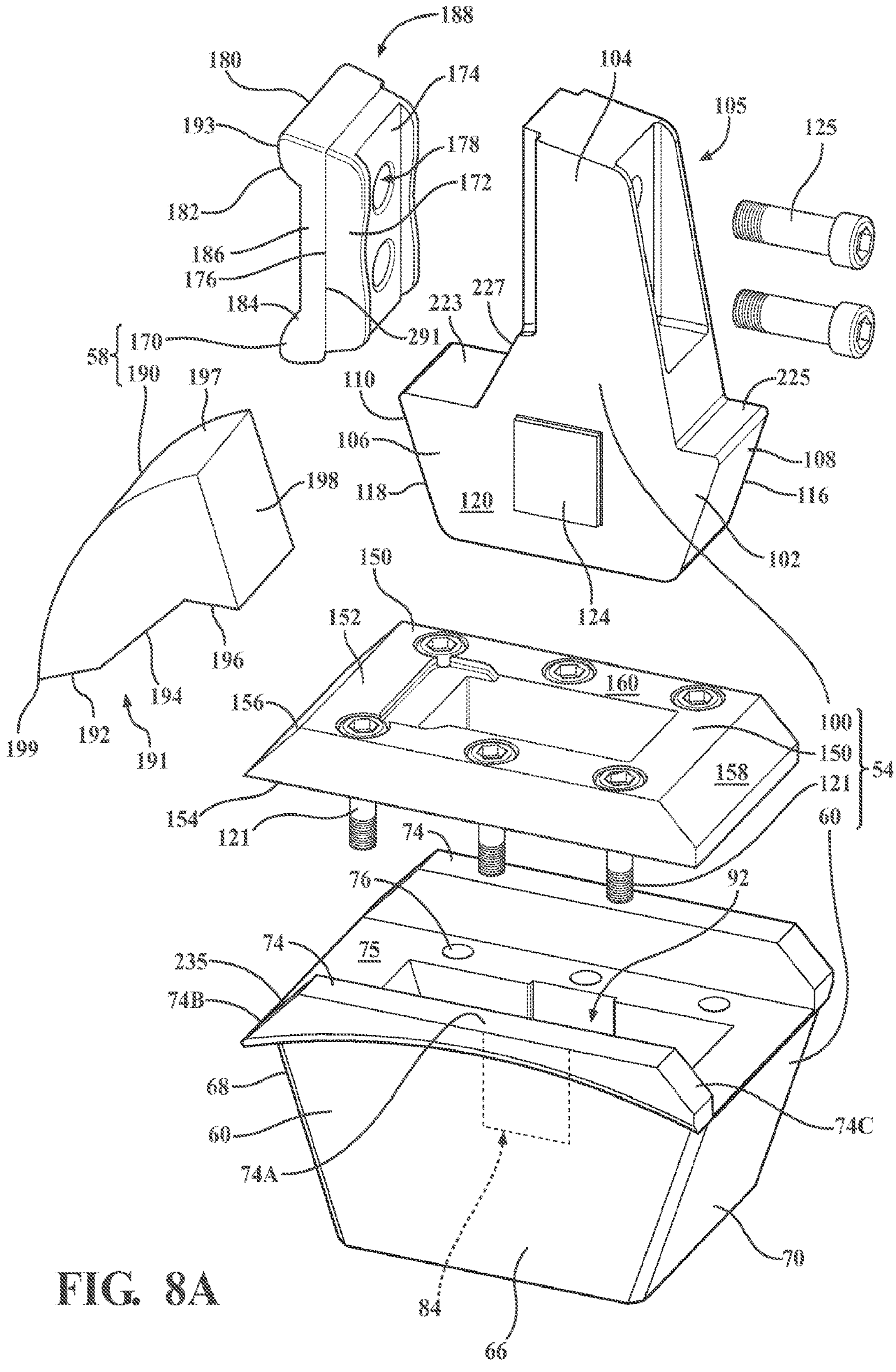
FIG. 8A is partially exploded side perspective view of FIG. 7 including a tool body and a pocket structure according to one exemplary embodiment.
Figure 8B:
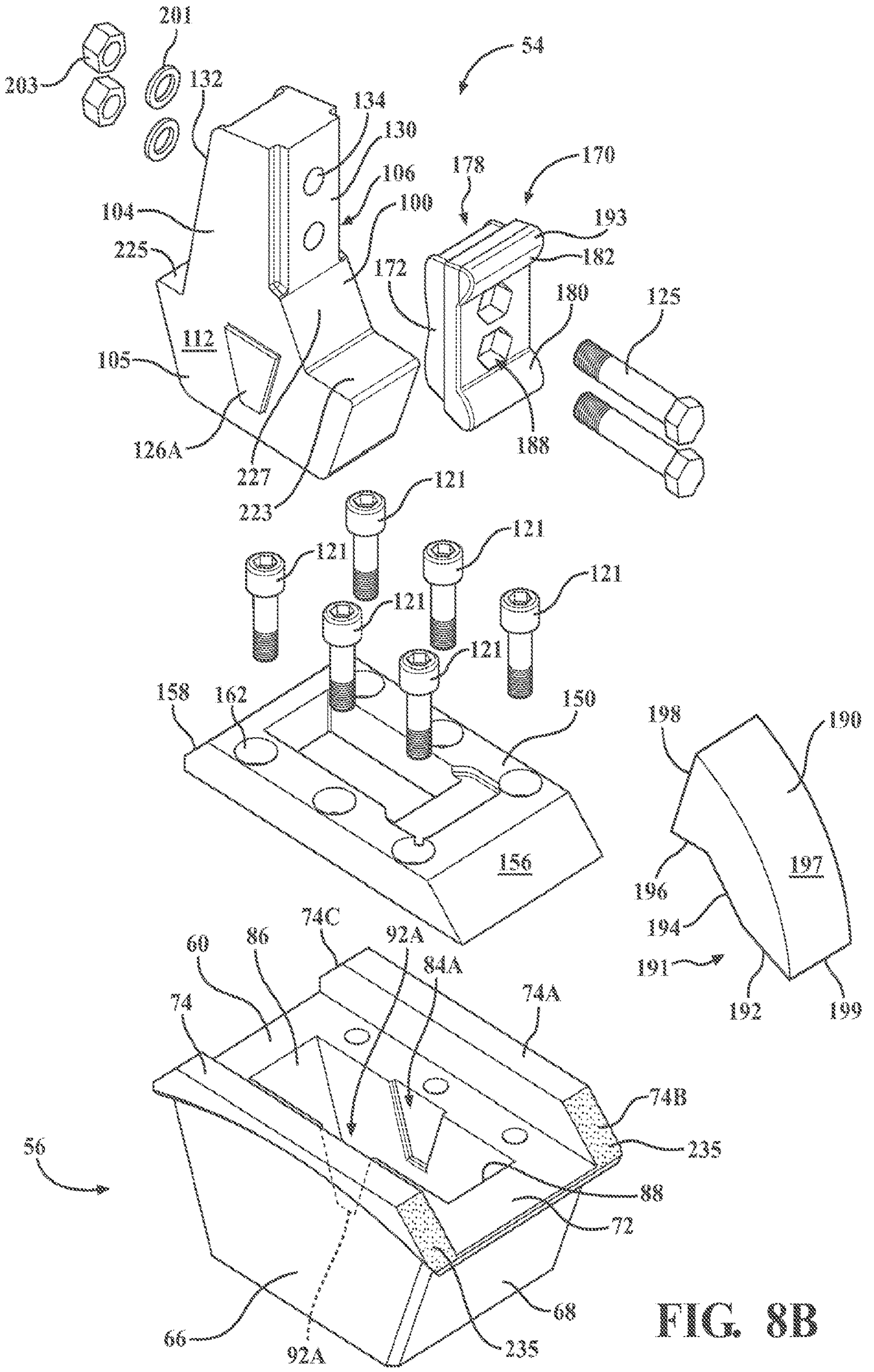
FIG. 8B is an exploded side perspective view of FIG. 7 including a tool body and a pocket structure according to another exemplary embodiment.
Figure 9A:
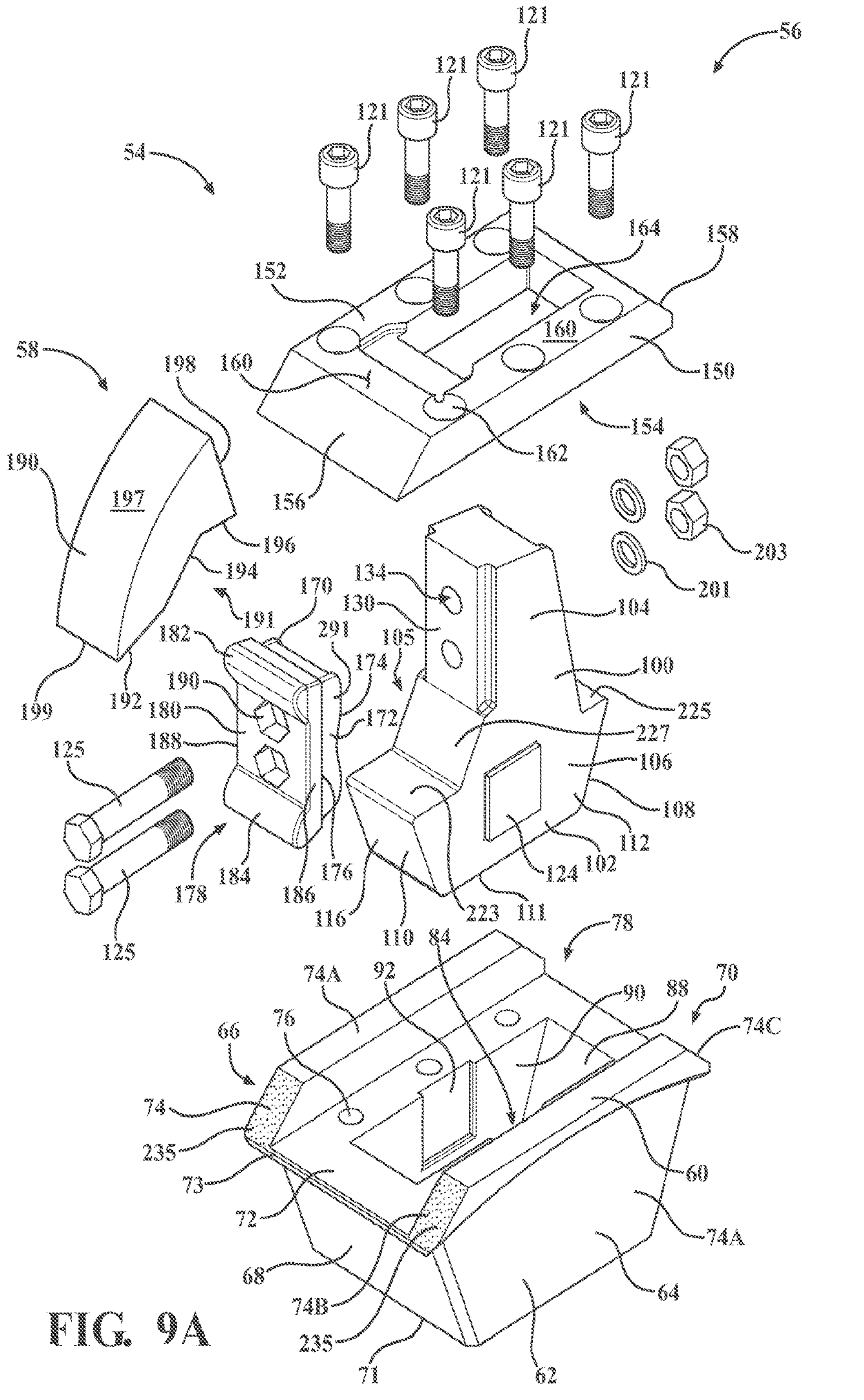
FIG. 9A is a rotated view of FIG. 8A rotated approximately 45 degrees and in a partial assembled state with the retaining plate moved above the tool body and further including washers and nuts.
Figure 9B:
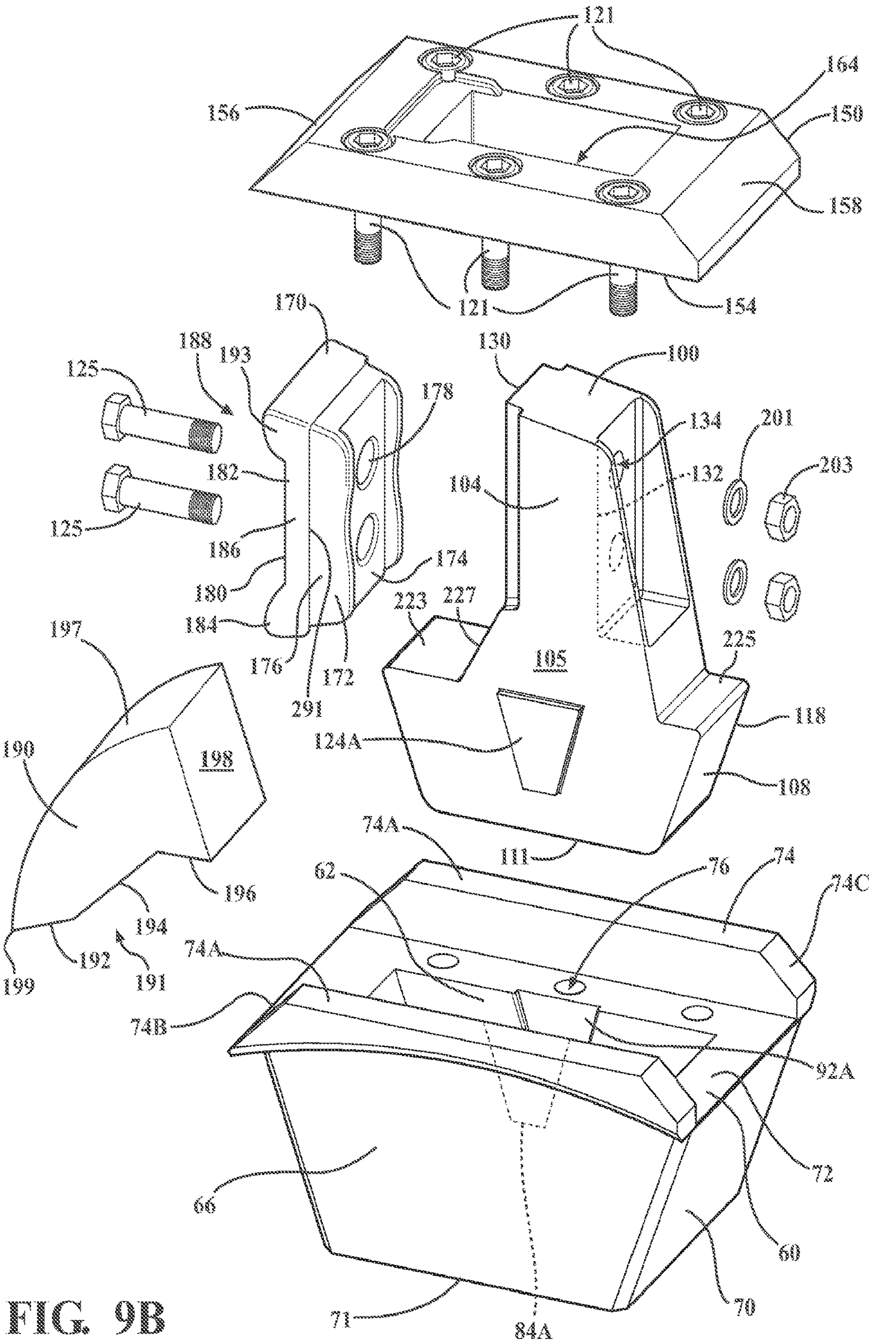
FIG. 9B is a rotated view of FIG. 8B rotated approximately 45 degrees and in a partial assembled state with the retaining plate moved above the tool body and the fasteners assembled to the retaining plate.

In certain embodiments, such as shown in FIGS. 8B and 9B, the width of these slots 84, 92 (and thus define wedge shaped slots 84A, 92A) is decreased in a consistent manner in a direction towards the bottom 71 such that it is minimized at a position closest to the bottom 71.

In certain embodiments, and as shown in each of FIGS. 8A-C and 9A-C, the depth of the respective slots 84, 92, measured in a direction normal to the width of the respective slots 84, 92, may remain constant or decrease in a consistent manner from the location corresponding to the ledge 72 in a direction towards the bottom 71.

As also shown in FIGS. 8A-C and 9A-C, the respective inward surfaces 82, 84, 86, 88 collectively define an inner cavity 78 extending between the bottom 71 and the ledge 72 that is configured to receive a bottom portion (i.e., a tool retention portion 102) of the tool body 100, as will be explained further below.

The ledge 72 defines a plurality of ledge fastener openings 76 extending between the lower side 73 and an upper surface 75 that are sized to receive a corresponding fastener 121 that is used to secure the retaining plate 150 to the upper surface 75 of the ledge 72 between the respective runners 74, as will be described further below.

The runners 74 includes frontward ramped surface 74B and rearward ramped surface 74C extending from a central top flat surface 74A. The frontward ramped surface 74B is also referred to as an angled leading surface 74B. In certain embodiments, a coating 235, such as a hardened coating 235 (i.e., a coating having a desired hardness to prevent wear during usage), is applied onto the frontward ramped surface 74B. In certain embodiments, the coating is a polymeric coating, such as a polyurethane coating, having a desired Shore hardness as measured by a durometer to correspond generally to the hardness of the material of the retaining plate 150.

Figure 7:
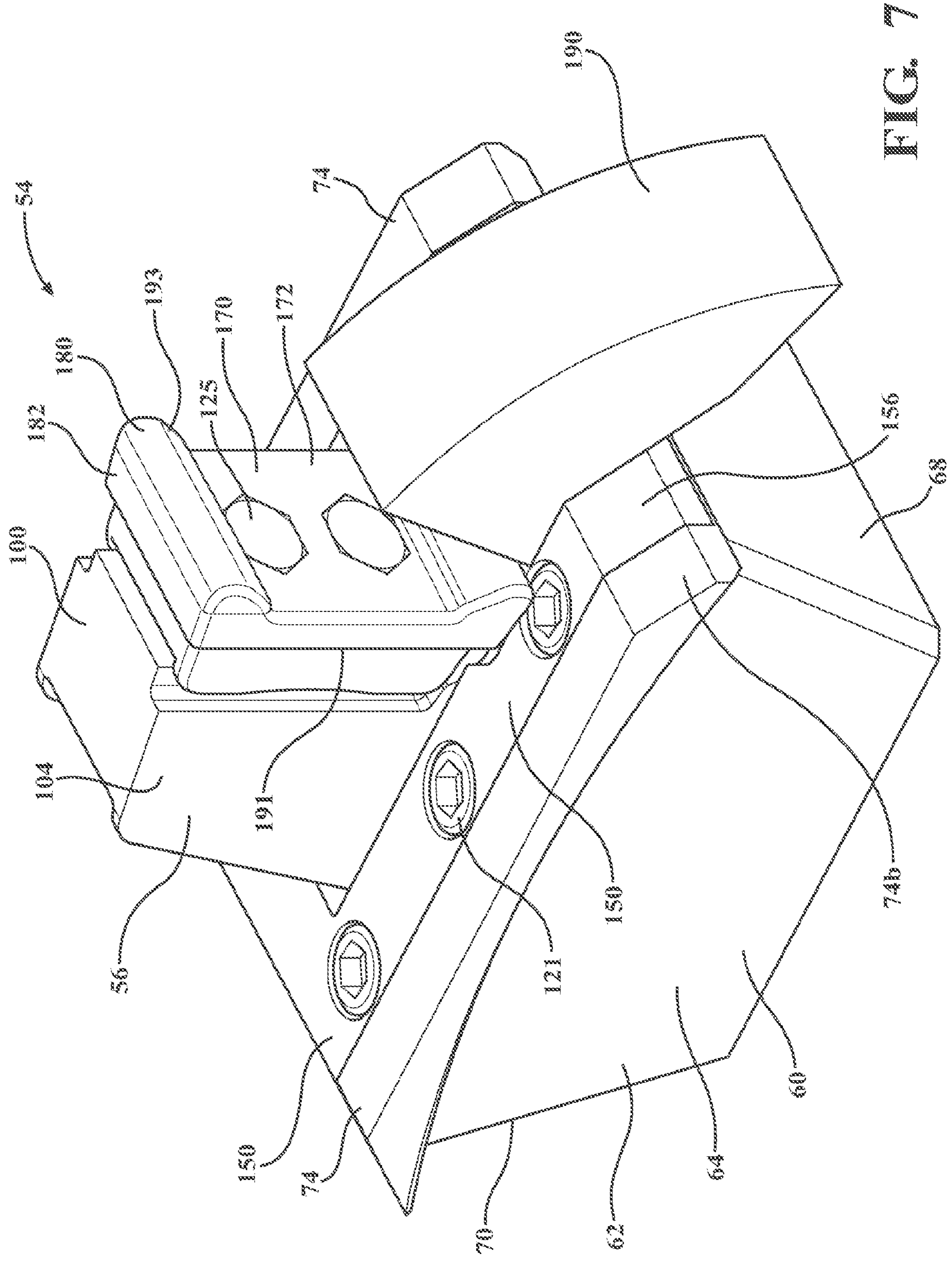
FIG. 7 is an assembled view of one of the processing tool assemblies configured for coupling to the drum of the rotor of FIG. 6.

The tool body 100 includes the tool retention portion 102 that is configured to be retained to the tool holder 56 within an inner cavity 78 of the pocket structure 60 and a tooth holding portion 104 that extends from the tool retention portion 102 in an assembled state (see FIG. 7).

The tool retention portion 102 includes a first outward side 105, an opposing second outward side 106, a pair of opposing connecting outward sides 108, 110 and a bottom side 111. Each of the respective outward sides 105, 106, 108, 110 include a respective outward surface 112, 120, 116, 118 that extends between the bottom side 111 and the tooth holding portion 104. In certain embodiments, as described below, the outward surface 116. 118 pair of opposing connecting outward sides are angled towards one another in a direction away from the tooth holding portion 103 so as to create a wedge shape (i.e., each of the pair of opposing connecting outward sides 108, 110 include an outward angled surface 116, 118).

The tool retention portion 102 also includes a front abutment surface 223 and a rear abutment surface 225 with the tooth holding portion 104 extending between the front and rear abutment surfaces 223, 225. Accordingly, a plane defined by the front and rear abutment surfaces 223, 225 serves to artificially divide the tool body 100 into the tool retention portion 102 and the tooth holding portion 104. Still further, in certain embodiments, the tool retention portion 102 also includes an intermediate angled surface 227 extending between the front abutment surface 223 and the tooth holding portion 104.

In certain embodiments, one or more of the outward surfaces 112, 120, 116, 118 includes one or more tabs 124, 126. Preferably, the number of the one or more tabs 124, 126 corresponds in size, shape and location to the one or more slots 84, 92 in the tool holder 56 as described above. Each of the respective tabs 124, 126 extend from the tooth holding portion 104 and terminate at a position spaced from the bottom side 111 of the tool retention portion 102. In certain alternative embodiments, the respective tabs 124, 126 may extend to the bottom side 111 of the tool retention portion 102.

Figure 8C:
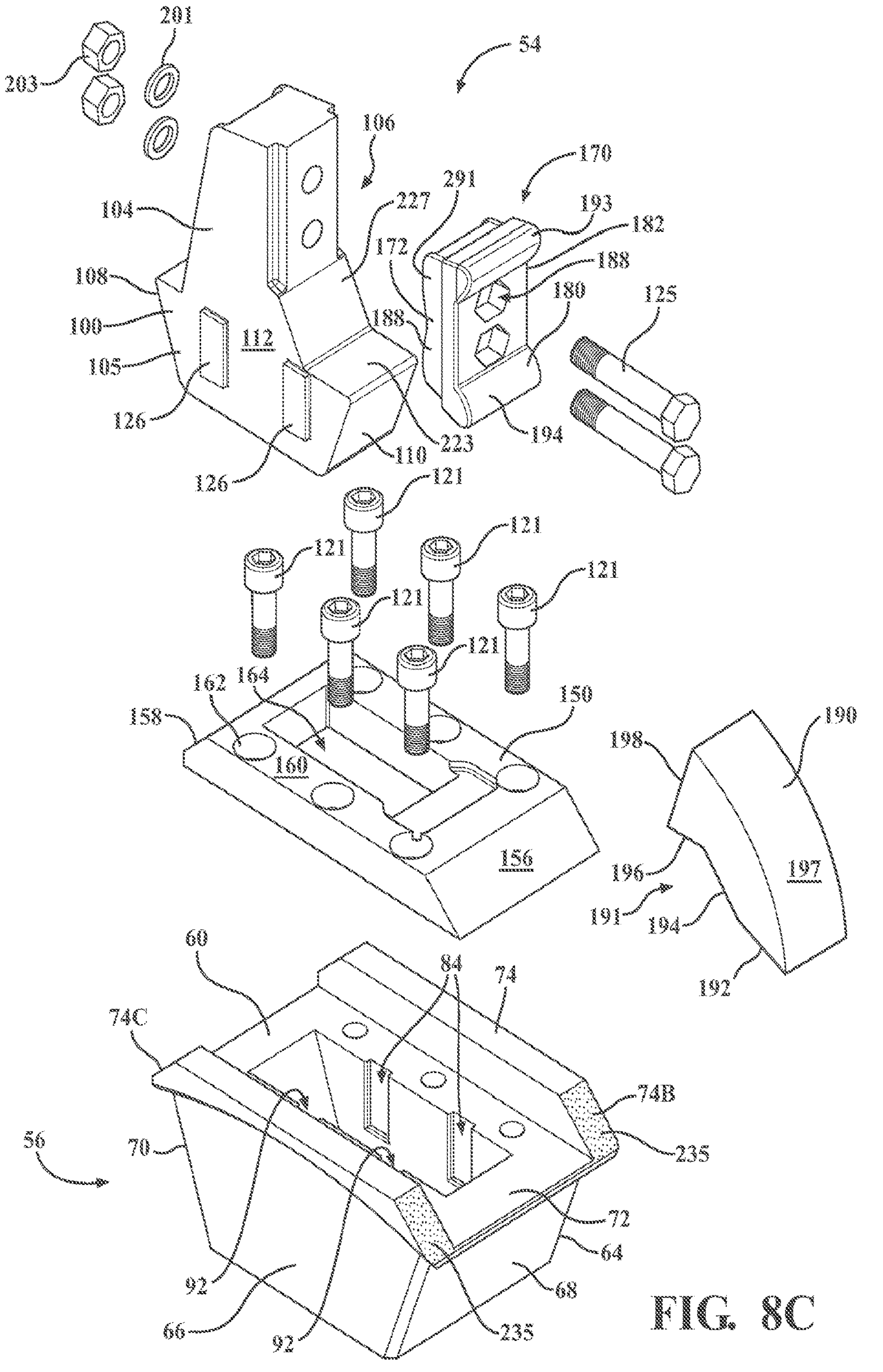
FIG. 8C is an exploded side perspective view of FIG. 7 including a tool body and a pocket structure according to another exemplary embodiment.

In the particular embodiments illustrated, the outward surface 112 of the outward side 105 includes one or more tabs 124 (shown in FIGS. 8A and 9A, and FIGS. 8B and 9B, as a single tab 124; shown in FIGS. 8C and (C as a pair of spaced apart tabs 124), while the inward surface 120 of the outward side 106 also includes one or more tabs 126 (shown in FIGS. 8A and 9A, and FIGS. 8B and 9B, as a single tab 126; shown in FIGS. 8C and (C as a pair of spaced apart tabs 126). The respective tabs 124, 126 extend from the area immediately beneath the tooth holding portion 104 (i.e., corresponding to the area beneath a plane defined by the front and rear abutment surfaces 223, 225) and terminate, in certain embodiments such as shown in FIGS. 8A-C and 9A-C, at a position spaced from the bottom side 111 of the tool retention portion 102. In certain alternative embodiments, the respective tabs 124, 126 may extend to the bottom side 111 of the tool retention portion 102.

Figure 9C:
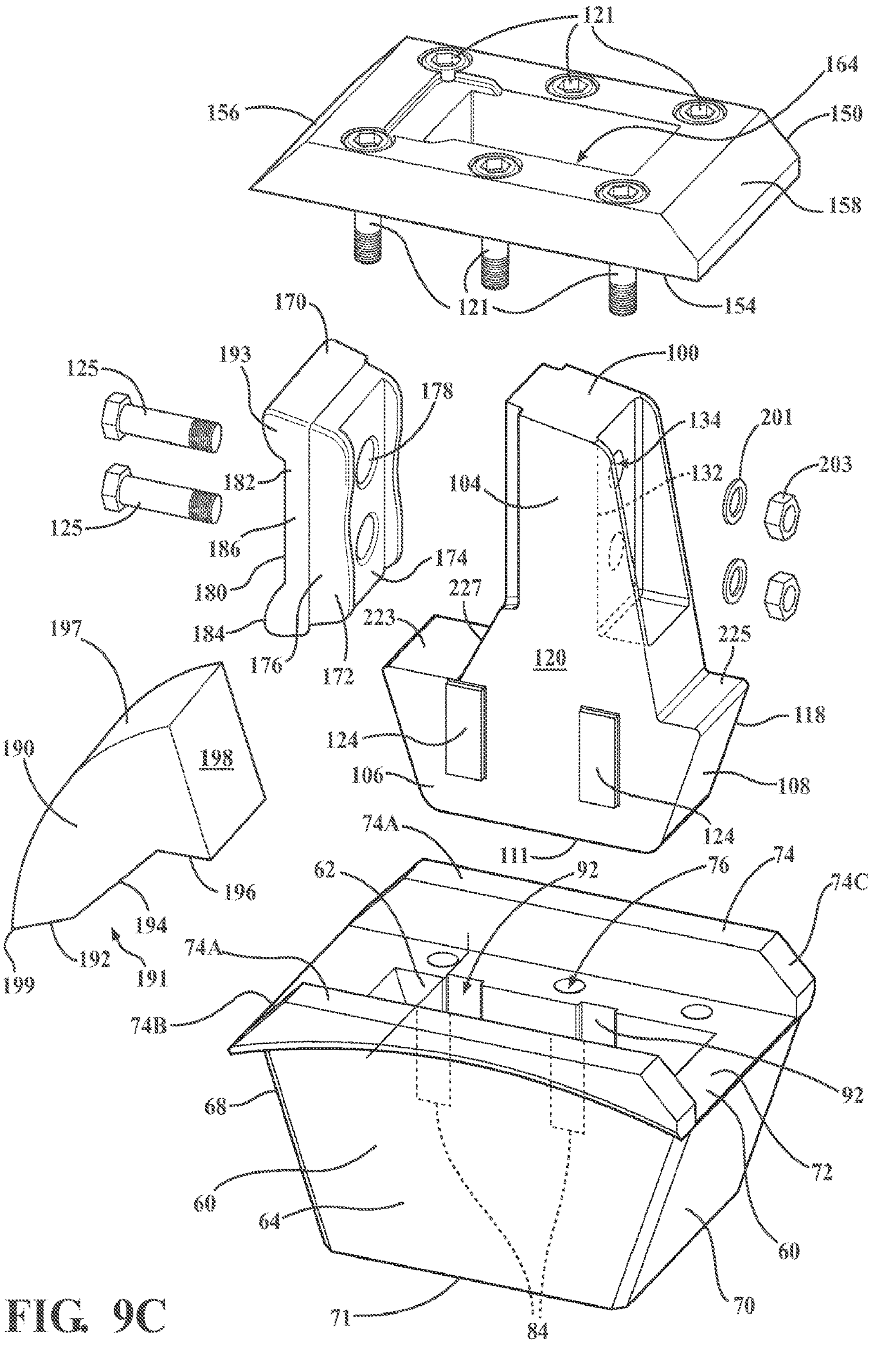
FIG. 9C is a rotated view of FIG. 8C rotated approximately 45 degrees and in a partial assembled state with the retaining plate moved above the tool body and the fasteners assembled to the retaining plate.

In certain embodiments, as shown in FIGS. 8A and 9A and in FIGS. 8C and 9C, the width of the tabs 124, 126 remains constant in a direction towards the bottom side 111 of the tool retention portion 102 (i.e., the tabs 124, 126 are rectangular in shape) and correspond in width to the constant width of the slots 84, 92 also shown in FIGS. 8A and 9A and in FIGS. 8C and 9C such that the rectangularly-shaped tabs 124, 126 may be accepted into the corresponding rectangularly shaped slots 84, 92

Alternatively, as shown in FIGS. 8B and 9B, the width of the tabs 124, 126 (measured between their side surfaces) decreases in a direction towards the bottom side 111 of the tool retention portion 102 (i.e., the tabs 124, 126 are wedge shaped tabs 124A, 126A) and correspond in width to the decreasing width of the slots 84A, 92A such that the wedge-shaped tabs 124, 126 may be accepted into the corresponding wedge shaped slots 84A, 92A.

Preferably, as noted above, the number, size, and location of the respective tabs 124, 126 correspond to the number, size, and location of the respective slots 84, 92 such that the respective tabs 124, 126 are received within, and in certain embodiments press fit within, the corresponding slot 84, 92, when the tool body 100 is coupled to the tool holder 56 as will be described further below.

Figure 10:
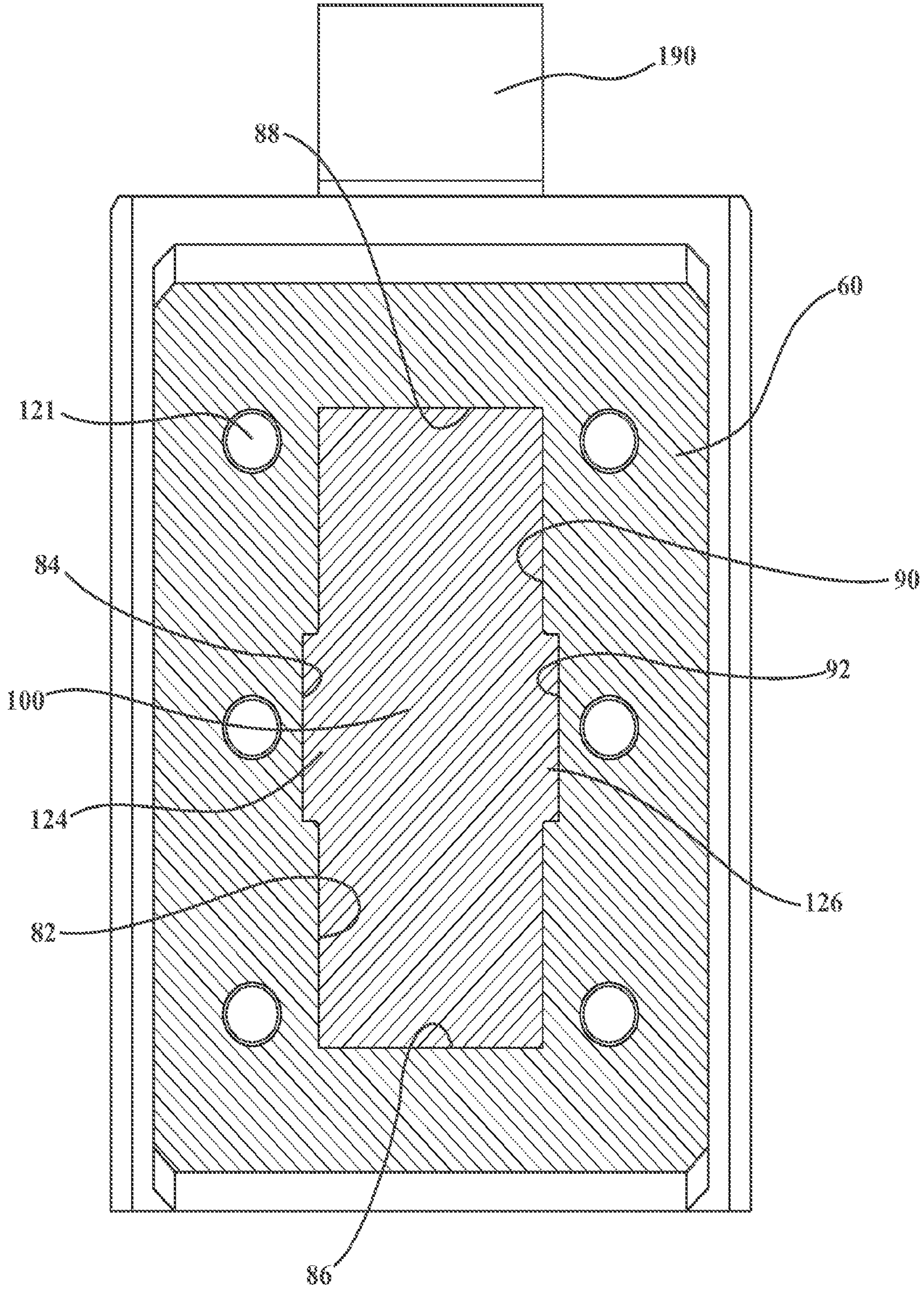
FIG. 10 is a bottom section view of FIG. 7 including the tool body and pocket structure according to FIGS. 8A and 9A.

As noted above, in the exemplary embodiments of FIGS. 8A and 9A (and as also shown in FIGS. 10, 11 and 14-15) and in FIGS. 8C and 9C, the tabs 124, 126 are rectangular is shape, and are preferably slid within and engaged, and in certain embodiments pressingly engaged, with the respective rectangular shaped slots 84B, 92B, of the tool holder 56 (see FIGS. 10, Alternatively, in the exemplary embodiments of FIGS. 8B and 9B, the respective tabs 124, 126 are wedge shaped, and hence are further defined as wedge shaped tabs 124A, 126A, which are press fit within corresponding wedge slots 84A, 92A when the tool body 100 is coupled to the tool holder 56.

In certain further related alternative embodiments, the arrangement of the slots and tabs can be reversed. In particular, the slots may be defined on the tool retention portion 102 (as opposed to the pocket structure 60), while the tabs are included in the pocket structure 60 (as opposed to the tool retention portion 102). The method of coupling the tool retention portion 102 within the pocket structure 60 works in substantially the same manner as the embodiments illustrated, but in this embodiment includes the tabs of the pocket structure 60 are introduced within the slots in the tool retention portion 102 is positioned within the tool body is coupled to the tool holder 56 in the assembled state. Regardless of the arrangement, the subject application contemplates wherein each respective tab is inserted with a corresponding respective slot when the tool retention portion 102 of the tool body 100 is retained to the tool holder 56.

The tooth holding portion 104 of the tool body includes a front side 130 and an opposing rear side 132 and defines one or more openings 134 (here shown as a pair of openings 134) that extend from the front side 130 to the rear side 132 that are configured to receive a fastener 125 for securing the front side 130 to the replaceable tooth assembly 170.

The retaining plate 150 includes a top side 152 and an opposing bottom side 154. The top side 152 includes a forward ramped surface 156 and a rearward ramped surface 158 extending from a central flat upper surface 160. The retaining plate 150 includes a notch to receive a portion of the waste processing tool 58.

When the retaining plate 150 is secured to the tool holder 56 in the assembled state, the central flat upper surface 160 of the retaining plate 150 preferably is aligned, and coplanar with, the respective central top flat surface 74A of each one of the runners 74. In addition, the forward ramped surface 156 preferably is aligned, and coplanar with, the respective frontward ramped surface 74B of each of the runners 74. Still further, the rearward ramped surface 158 preferably is aligned, and coplanar with, the respective rearward ramped surface 74C of each of the runners 74. Even still further, when the retaining plate 150 is secured to the tool holder 56 in the assembled state, the retaining plate 150 is also positioned onto and is engaged with the front and rear abutment surfaces 223, 225 of the tool body 100 to retain the tool body 100 within the tool holder 56.

The retaining plate 150 also defines one or more fastener openings 162 which each extend between the central flat surface 160 of the top side 152 and the bottom side 154. These fastener openings 162 are each configured to receive a fastener 121 used for securing the retaining plate 150 to the tool holder 56, as will be discussed further below.

The retaining plate 150 also defines a central opening 164 extending between the central flat surface 160 of the top side 152 and the bottom side 154. The central opening 164 is dimensioned smaller in length and width than the corresponding length and width dimensions of the inner cavity 78 defined at the ledge 72 but is generally aligned with the inner cavity 78 when the retaining plate 150 is secured to the tool holder 56. In this manner, the retaining plate 150 is secured to the tool holder 56, the retaining plate 150 can function to retain the tooth retention portion 104 of the tool body 100 within the inner cavity 78 wherein the front and rear abutment surfaces 223, 225 are engaged with the lower side 154 of the retaining plate 150 with the tooth holding portion 106 extending through the central opening 164 and outside the pocket structure 60. In conjunction therewith, the respective outward surfaces 112, 120, 116, 118 of the tool retention portion 102 are positioned into engaging contact with the corresponding inward surfaces 82, 90, 86, 88 of the tool holder 56 and such that the respective tabs 124, 126 disposed within the corresponding slots 84, 92 and such that the gap 61 is present between the bottom side 111 of the tool retention portion 102 and the bottom 71 of the pocket structure 60.

Each tooth assembly 170 includes a base plate 172 having an attachment face 174 and an opposing tooth mounting face 176. The base plate 172 also defines one or more openings 178 (shown as a pair of openings 178) extending between the attachment face 174 and the tooth mounting face 176 and configured to receive a fastener 125 used to secure the tooth assembly 170 to the tool retention portion 102 with the tooth mounting face 176 aligned with and adjacent to the corresponding front side 130 of the tool retention portion 102. Washers 201 and nuts 203 are also used to secure the fastener 125.

Each tooth assembly 170 also includes a tooth 180 that is coupled to, or otherwise mounted or secured to, the tooth mounting face 176 of the base plate 172. The tooth 180 includes an upper projecting portion 182, a lower projecting portion 184, and a pair of side connecting portions 186, 188 separately connecting the upper projecting portion 182 to the lower projecting portion 184. The tooth 180 also defines an inner opening 190 that allows access to the attachment face 174 and openings 178.

A first surface of each of the upper projecting portion 182, the lower projecting portion 184, and the pair of side connecting portions 186, 188 collecting define an inner mounting face 291 that is positioned adjacent to the tooth mounting face 176 of the base plate 172 when the tooth 180 is mounted to the base plate 172. In addition, a second surface of each of the upper projecting portion 182, the lower projecting portion 184, and the pair of side connecting portions 186, 188 collecting define an outer wear face 193.

The tooth 180 is preferably formed as an exposed wear member removably secured the tooth mounting face 176 of the base plate 172. With this structure, the wear member 193 and tooth 180 can be quickly and easily replaced in the result of damage by a non-reducible or as a result of wear through operation of the material processing machine. Alternatively, and preferably, when the exposed wear member 193 and tooth 180 requires replacing as the result of damage by a non-reducible or as a result of wear through operation of the material processing, each tooth assembly 170 can be quickly and easily replaced as described below.

Each guide member 190 has an inner surface 191, an opposing outer surface 197, and an end surface 198. The inner surface 191 may be subdivided into an outward surface 192, an inward surface 196, and a middle surface 194. In the assembled state such as in FIGS. 7 and 10-16, the middle surface 194 is positioned adjacent to, and is preferably affixed to, the forward ramped surface 156 of the retaining plate 150. In addition, the inward surface 196 is positioned adjacent to the top side 152 of the retaining plate 150, while the outward surface 192 extends beyond the end of the forward ramped surface 156 and is positioned parallel to or otherwise adjacent to, and in certain embodiments in contact with, the outer surface 52 of the drum 51 and rotor 48. The outer surface 197 is preferably gently curved and extends between an edge 199 of the outward surface 192 and the end surface 198. The end surface 198 extend generally normal from the end of the curved outer surface 197 between the curved outer surface 197 and the inward surface 196 and is spaced from the tooth 180 in the assembled state.

Figure 5:
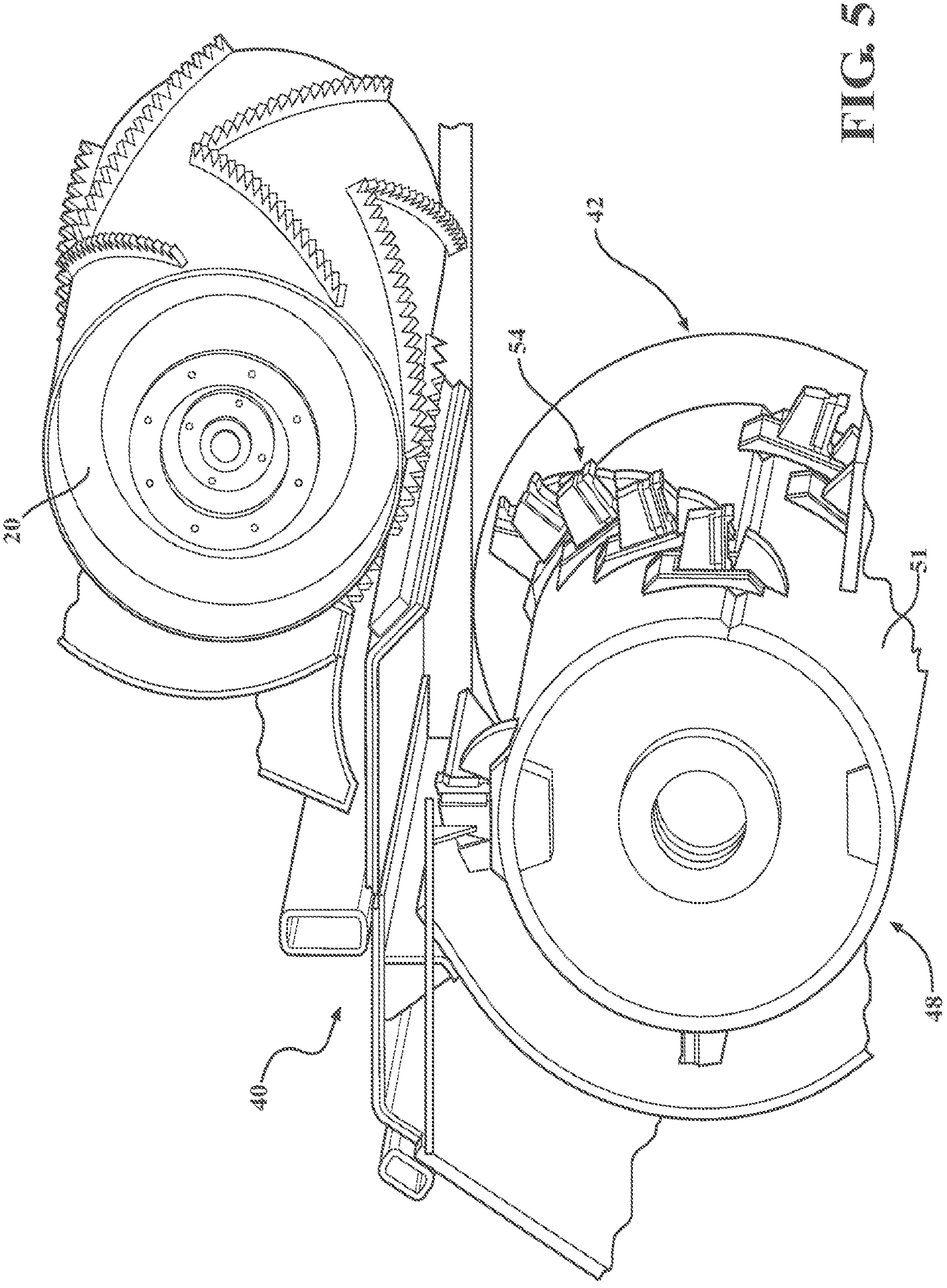
FIG. 5 is a partial perspective view of the reducing chamber of FIG. 4.
Figure 6:
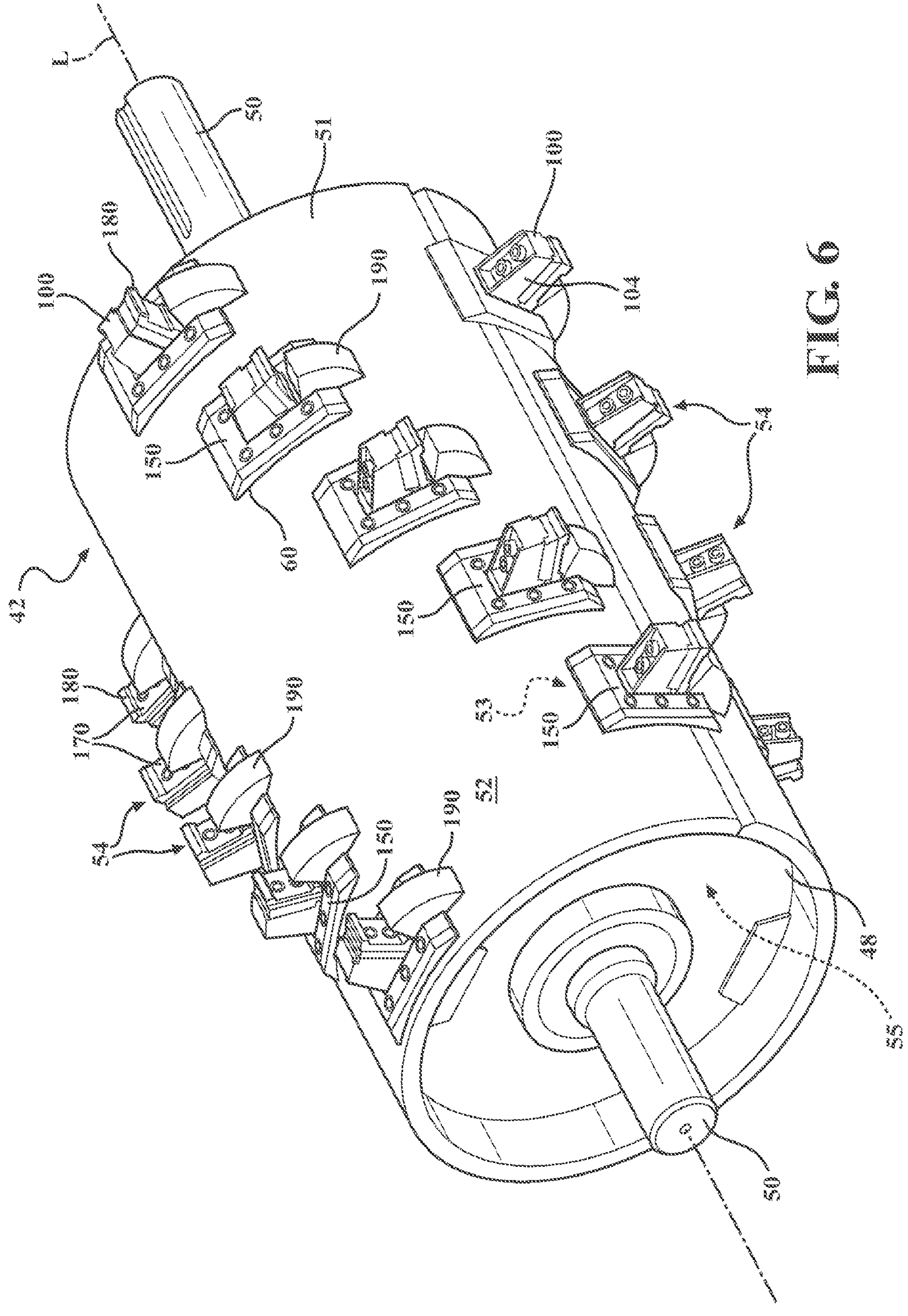
FIG. 6 is a perspective view of a material reducing system in accordance with an exemplary embodiment of the present disclosure.

Now returning to the reducing chamber 40 illustrated in FIGS. 3-5, the reducing system 14 includes a housing 284 and one or more screens 286 that at least partially encircle the rotor 48 and define a boundary of the reducing chamber 40. The housing 284 may include barriers and/or the screen (s) 286 may be arcuate with a radius of curvature approximate the rotor 48 such that at least a portion of the reducing chamber 40 is substantially coaxial to the rotor 48 when viewed in elevation. The present disclosure contemplates that the gap may be selectively adjustable based on the size and/or type of processing tool assemblies 54 coupled to the rotor 48. Only a portion of the processing tool assemblies 54 are shown assembled in the figures, and it should be appreciated that the gap generally extends about the rotor 48.

The housing 284 may define other characteristics of the reducing chamber 40, such as side barriers. For another example, barriers of the housing 284 generally define an upper recess within the reducing chamber 40. The upper recess may be positioned intermediate the inlet area 44 and the outlet area 46, and more particularly within the transition zone 49 and/or the outlet zone 47. The upper recess is configured to provide an area of clearance between the processing tool assemblies 54 and the boundary of the reducing chamber 40. Based on the relatively narrow gap about the rotor 48 at certain points within the reducing chamber 40, and the tooth assembly 170 of the processing tool assemblies 54, the forces provided by the laminar flow at the boundary caused by centripetal fluid forces are typically significant. The unreduced, partially reduced and fully reduced material similarly occupies the gap between the inlet area 44 and the outlet area 46. The clearance provided by the upper recess allows expansion of the fluid (e.g., air) within the reducing chamber 40 to minimize a throttling effect at the boundary within the gap. The clearance may also reduce wear from any material and/or non-reducible objects (e.g., a rock or other hard debris) moving about the boundary in the operation direction OD by limiting the contact between the same. The upper recess provides the area of clearance for non-reducible objects to be temporarily deposited before being directed in the operating indirection OD to the inlet zone 45. Due to potential wear proximate the upper recess, one or more of the barriers 284*c* may be removably secured to provide ease of replacement. Lastly, the upper recess may further provide relief from larger obstructions within the reducing chamber 40 to maintain efficient operation of the reducing system 14.

The boundary of the reducing chamber 40 is at least partially comprised of the screen(s) 286. Referring to FIG. 3, the screen(s) 286 are generally positioned within outlet zone 47 and separate the reducing chamber 40 from the discharge system 16. The screens screen(s) 286 may be arcuate and substantially concentric with the rotor 48. In an exemplary embodiment, the screen(s) 286 are separated from the processing tool assemblies 54 by the gap. The gap is preferably small such that the potential for the screen(s) 286 to facilitate further reduction of the material is insignificant. Stated differently, an insignificant amount of material is further reduced by edges of the openings of the screen(s) 286. Rather, the primary function of the screens screen(s) 286 is to permit the waste material to exit the reducing chamber 40 once sufficiently reduced.

In an exemplary embodiment, the screen(s) 286 comprise a movable screen and a fixed screen. The movable screen is pivotally mounted and may be pivoted with one or more hydraulic cylinders. In an event that a non-reducible object becomes entrapped within the reducing system 14, the hydraulic cylinders pivot the movable screen 286 downwardly, thereby creating an opening spanning substantially the width of the rotor 48. Should this be done while the rotor 48 continues to operate, the non-reducible may eject automatically through the opening. Alternatively, the rotor 48 may be powered down and the non-reducible object manually removed from the reducing chamber 40 via the opening. In the former instance, an advantage of the movable screen 286 permits clearing of non-reducible material from the reducing chamber 40 without stopping operation of the rotor 48.

Figure 11:
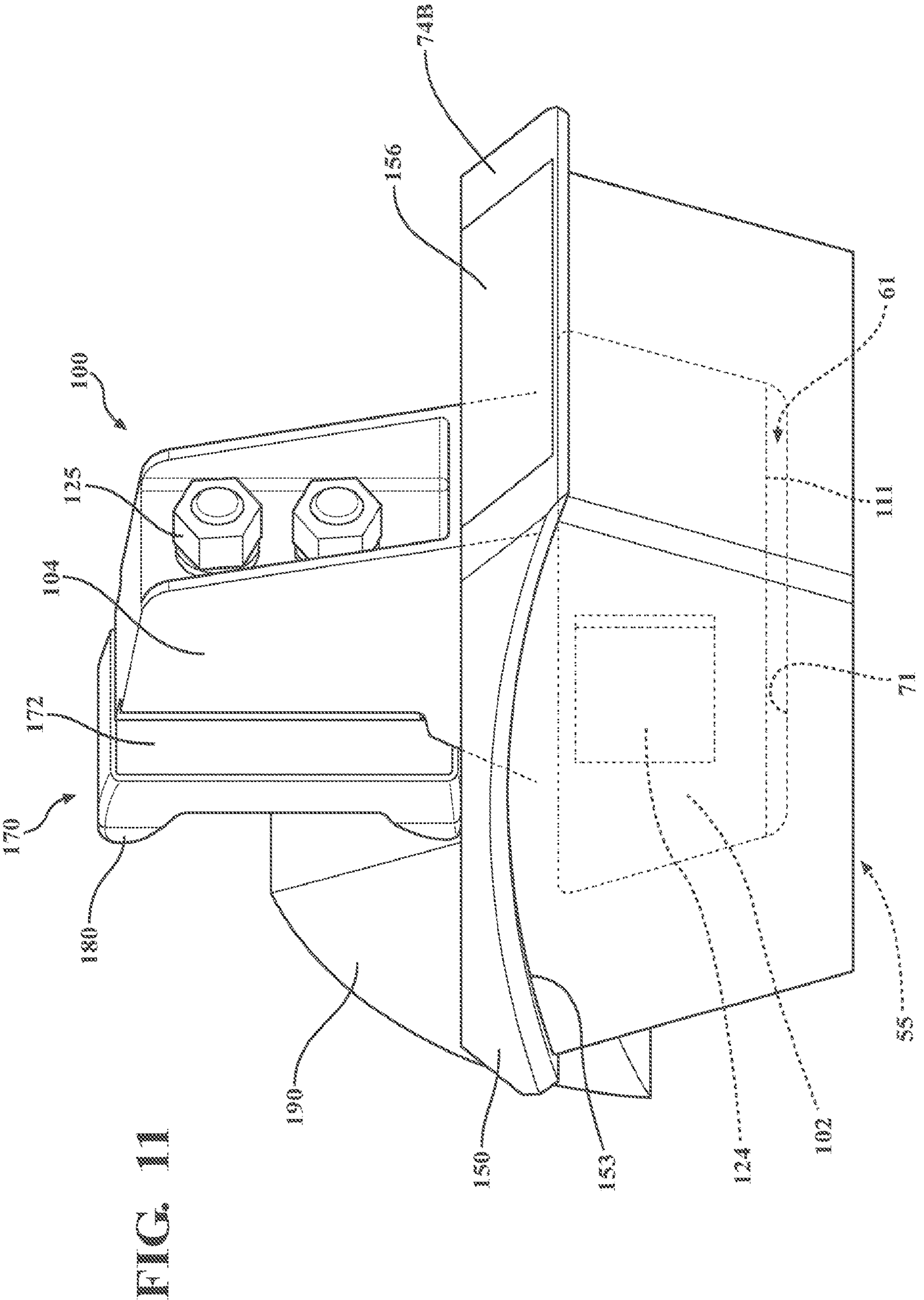
FIG. 11 is a perspective view of FIG. 7 including the tool body and pocket structure according to FIGS. 8A and 9A, with a portion of the pocket structure in phantom to illustrate components contained within the pocket structure in an assembled state.
Figure 12:
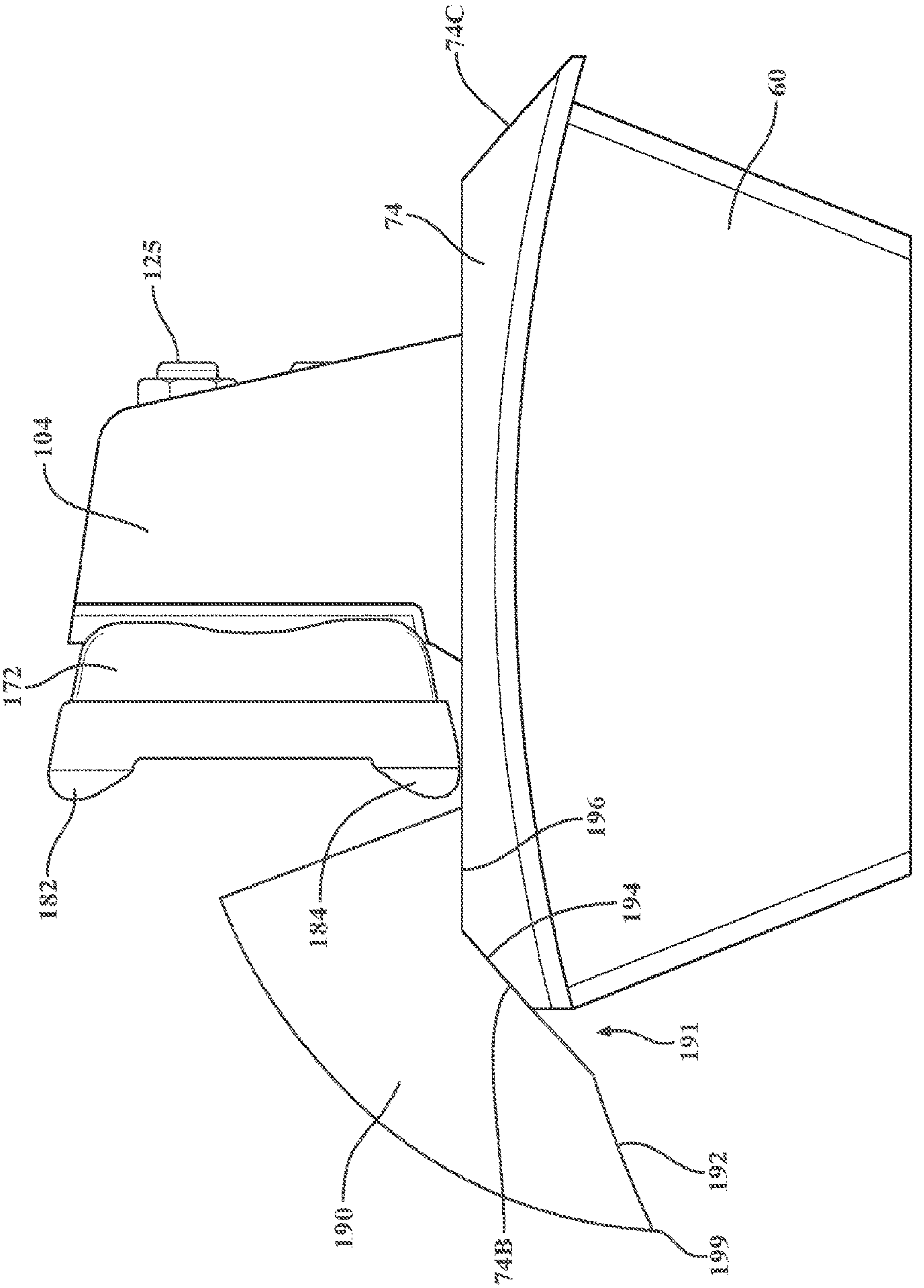
FIG. 12 is a side view of FIG. 7 including the tool body and pocket structure according to FIGS. 8A and 9A.
Figure 13:
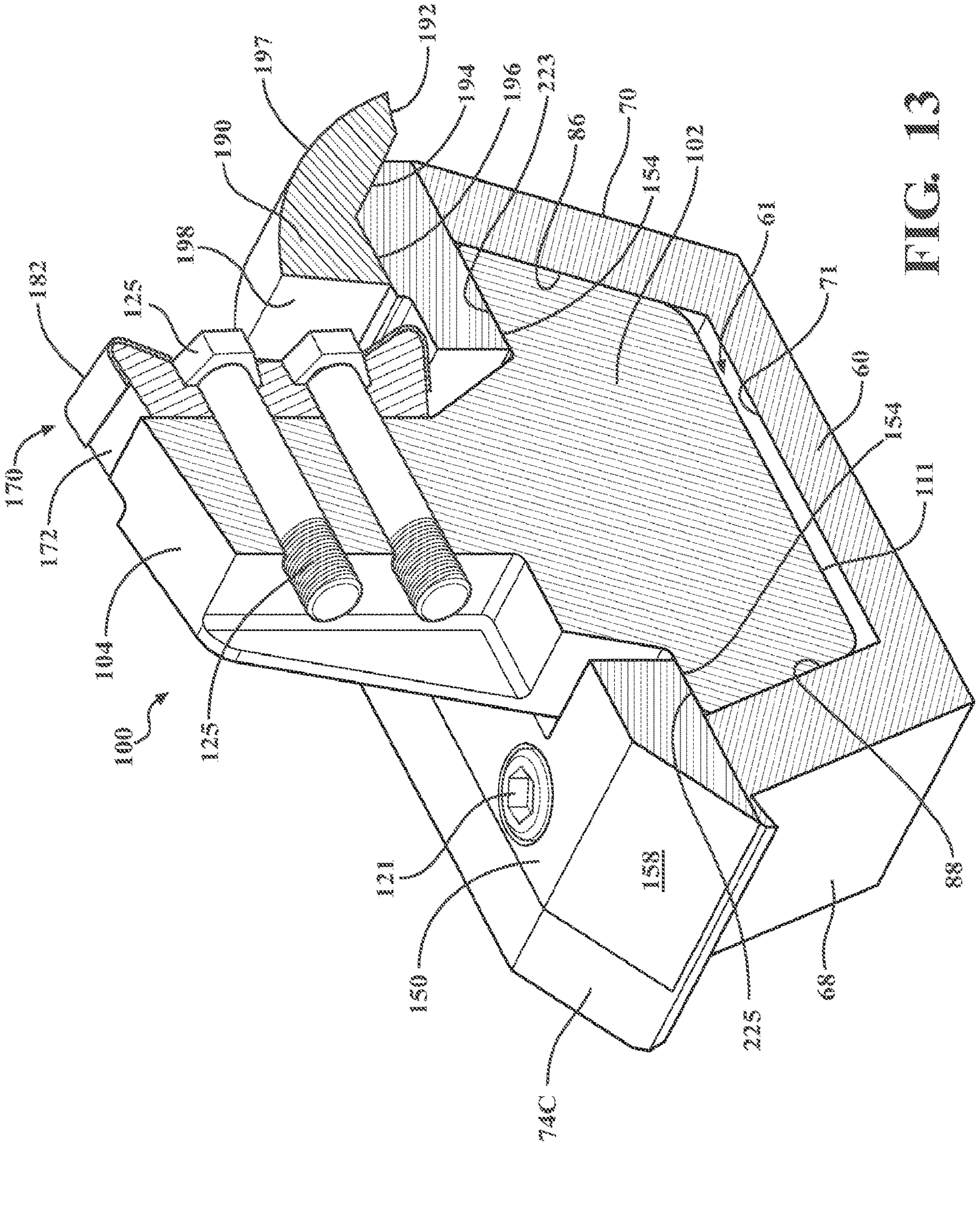
FIG. 13 is a section perspective view of FIG. 7 including the tool body and pocket structure according to FIGS. 8A and 9A.
Figure 14:
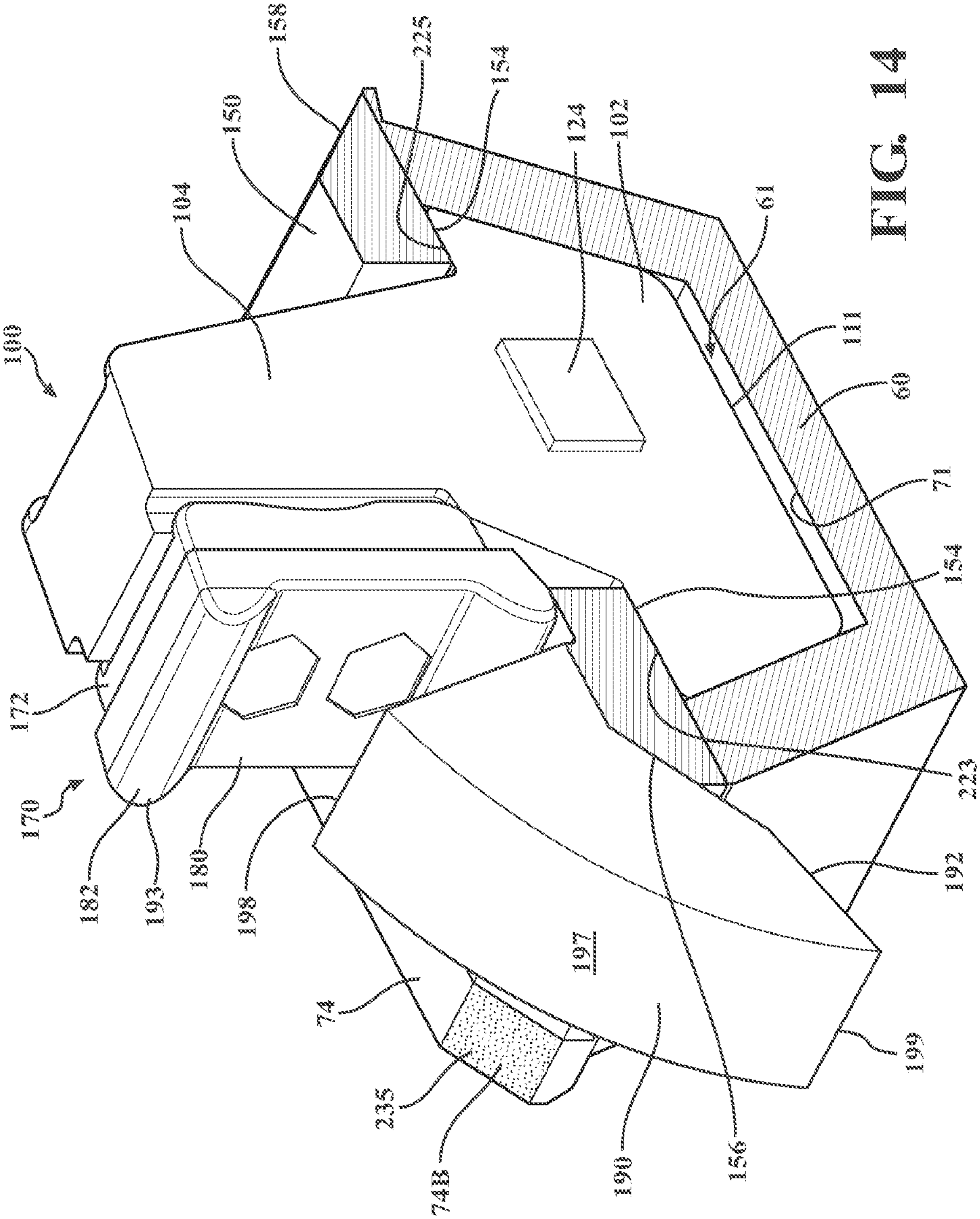
FIG. 14 is another section perspective view of FIG. 7 including the tool body and pocket structure according to FIGS. 8A and 9A in which one of the tabs on the tool structure is visible.
Figure 15:
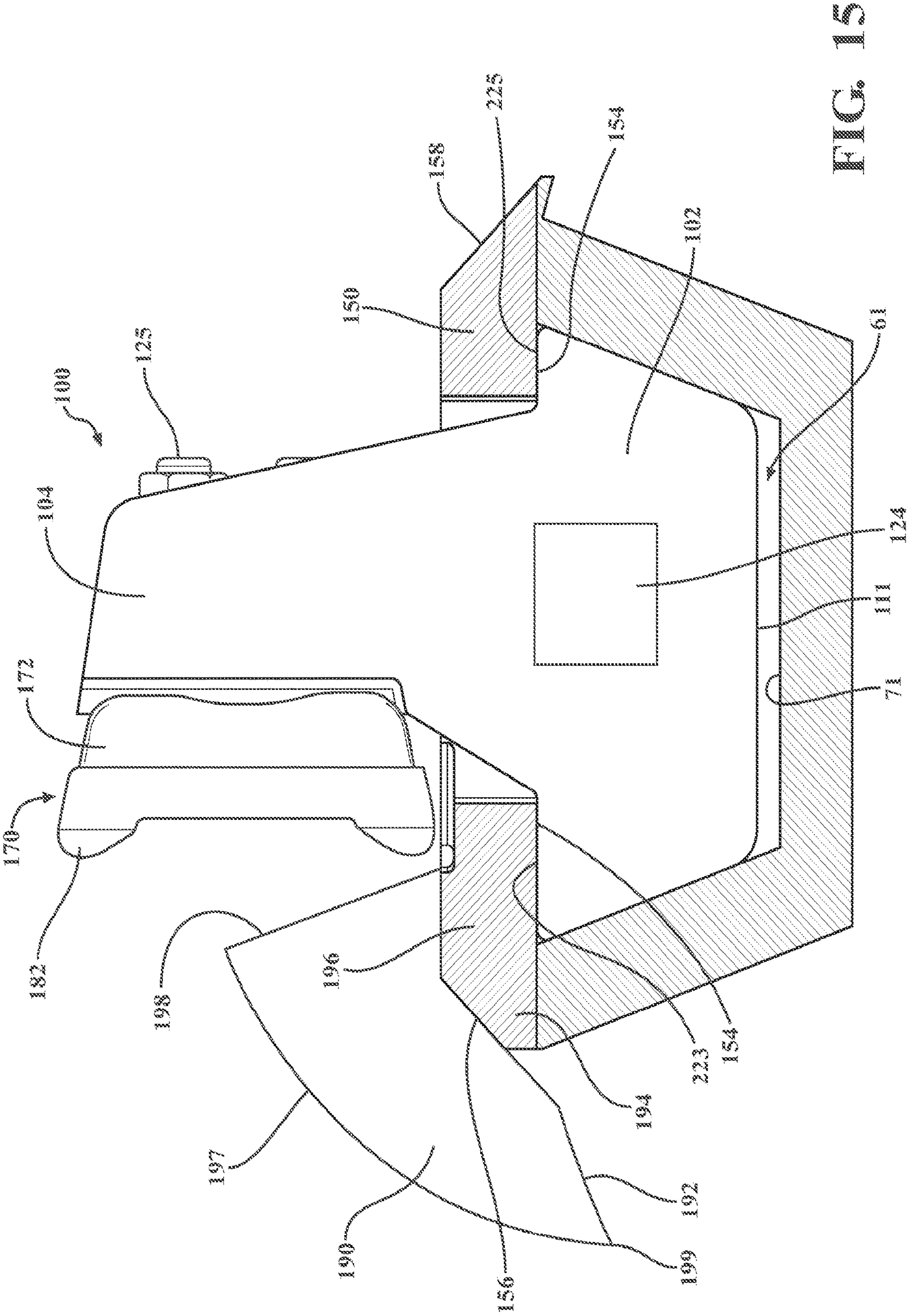
FIG. 15 is a side view of FIG. 14.
Figure 16:
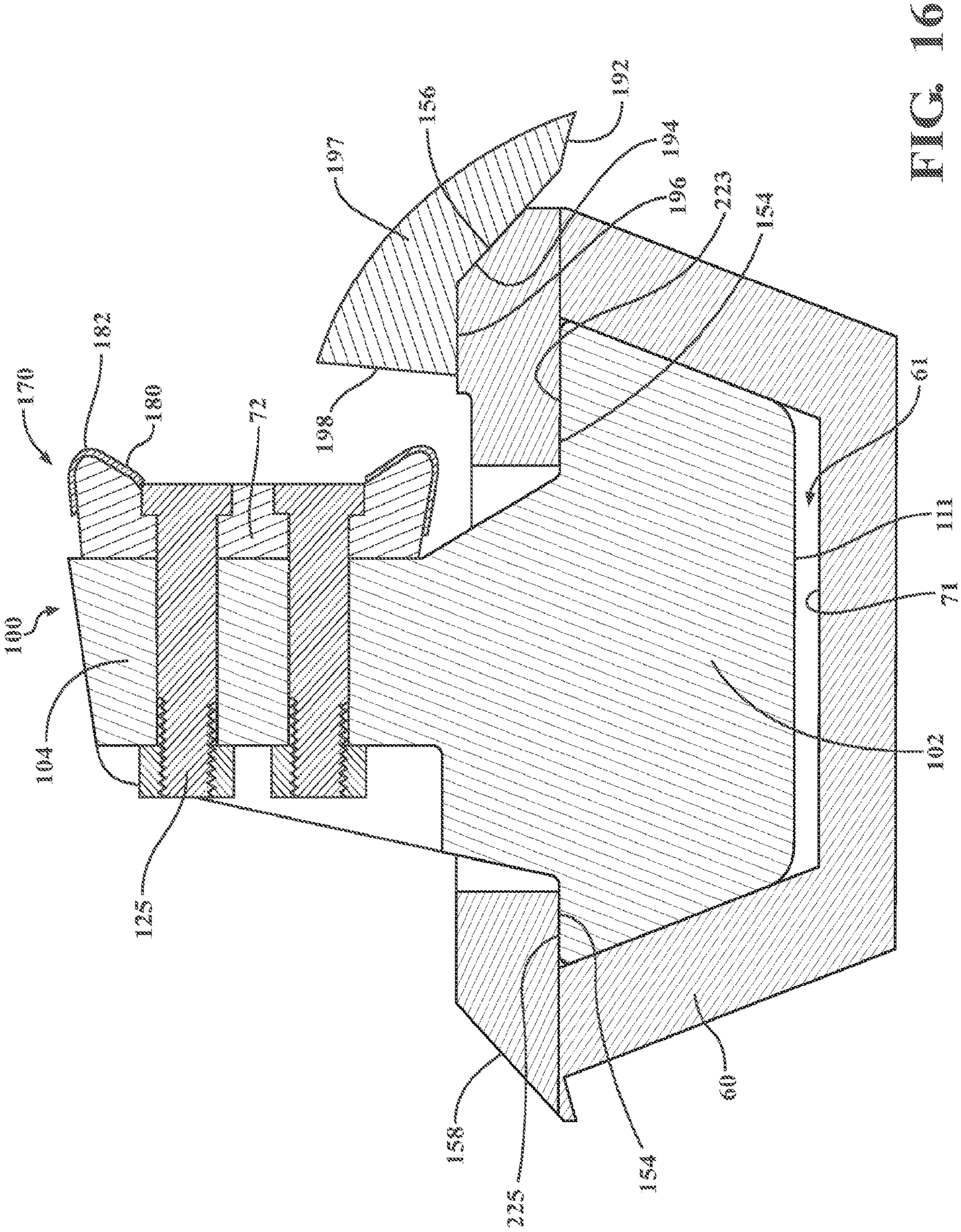
FIG. 16 is a side view of FIG. 13.

Reducing operations of the processing machine 10 will now be discussed. As previously described, the feed conveyor 28 operates in a generally clockwise direction or counterclockwise direction (shown as counterclockwise in FIG. 3) to direct the waste material disposed thereon towards the reducing chamber 40. The feed wheel 20 may further facilitate with such directing. The material passes through the inlet opening 35 of the infeed system 12 and the inlet area 44 of the reducing chamber 40. Referring now to FIGS. 3, 4, and 11, the waste material reaches a terminal end of the feed conveyor 28. As mentioned, the feed conveyor 28 is a track comprised of slats 294. The slats 294 are designed to withstand the demands of the reducing operation. In one example, each of the slats includes a hardened upper portion of carbide, steel, or other suitably hard and durable material.

The terminal end of the feed conveyor 28 is positioned sufficiently proximate to the path of the processing tool assemblies 54 of the rotor 48 such that the material is reduced by the processing tool assemblies 54 against the slats 294, thereby further defining the material reducing system 42. In other words, the material reducing system 42 includes the portion of the slats 294 that interface with the processing tool assemblies 54 of the rotor 48. With particular reference to FIG. 3, the waste material is reduced effectively contemporaneous with "leaving" the feed conveyor 28. Reducing the material directly against the slats 204 eliminates the need for an anvil commonly known in the art, and advantageously eliminates any area or volume between the feed conveyor 28 and such an anvil for material to collect and wedge. FIGS. 3 and 4 generally shows that the material reduction first occurs in the inlet zone 45 with the rotor 48 having the clockwise operating direction OD.

With further respect to the processing tool assemblies 54, the waste material first encounters the guide member 190, which is positioned along the leading edge portion of each of the processing tool assemblies 54 along the rotational path in the operating indirection OD. The waste material slide along the curved outer surface 197 from the edge 199 towards the end surface 198. The waste material then enters the gap between the end surface 198 and the tooth 180 of the tooth assembly 170. The waste material then contacts the upper projecting portion 182, the lower projecting portion 184, and the pair of side connecting portions 186, 188 where it is reduced. The use of the guide member 190 prevents the accumulation of too much waste material per rotational cycle along the face of each of the tooth assemblies 170, therein increasing the wear life of each respective tooth 180.

In the event that one or more tooths 180 or tooth assemblies 170 are worn or damaged during the waste reduction process, the configuration of the processing tool assemblies 54 is such that they can easily be removed and replaced.

Once the material has been reduced and expelled from the reducing system 14, the discharge conveyor 32 (see FIG. 1) of the discharge system 16 directs the waste products to the appropriate location for stacking, storage, shipping, or other desired processing.

In further embodiments, the reducing system may also include an auxiliary feed system that includes a series of augers positioned inferior to the rotor in a side by side configuration across the width of the reducing chamber. The augers are powered by a motor and configured to direct waste material from a lower portion of the basin of the reducing chamber 40 to an upper portion of the basin. The auxiliary feed system may further include an anvil positioned adjacent to the basin proximate to the rotor, with the anvil and auger designed to facilitate a second reducing operation.

Figure 17:
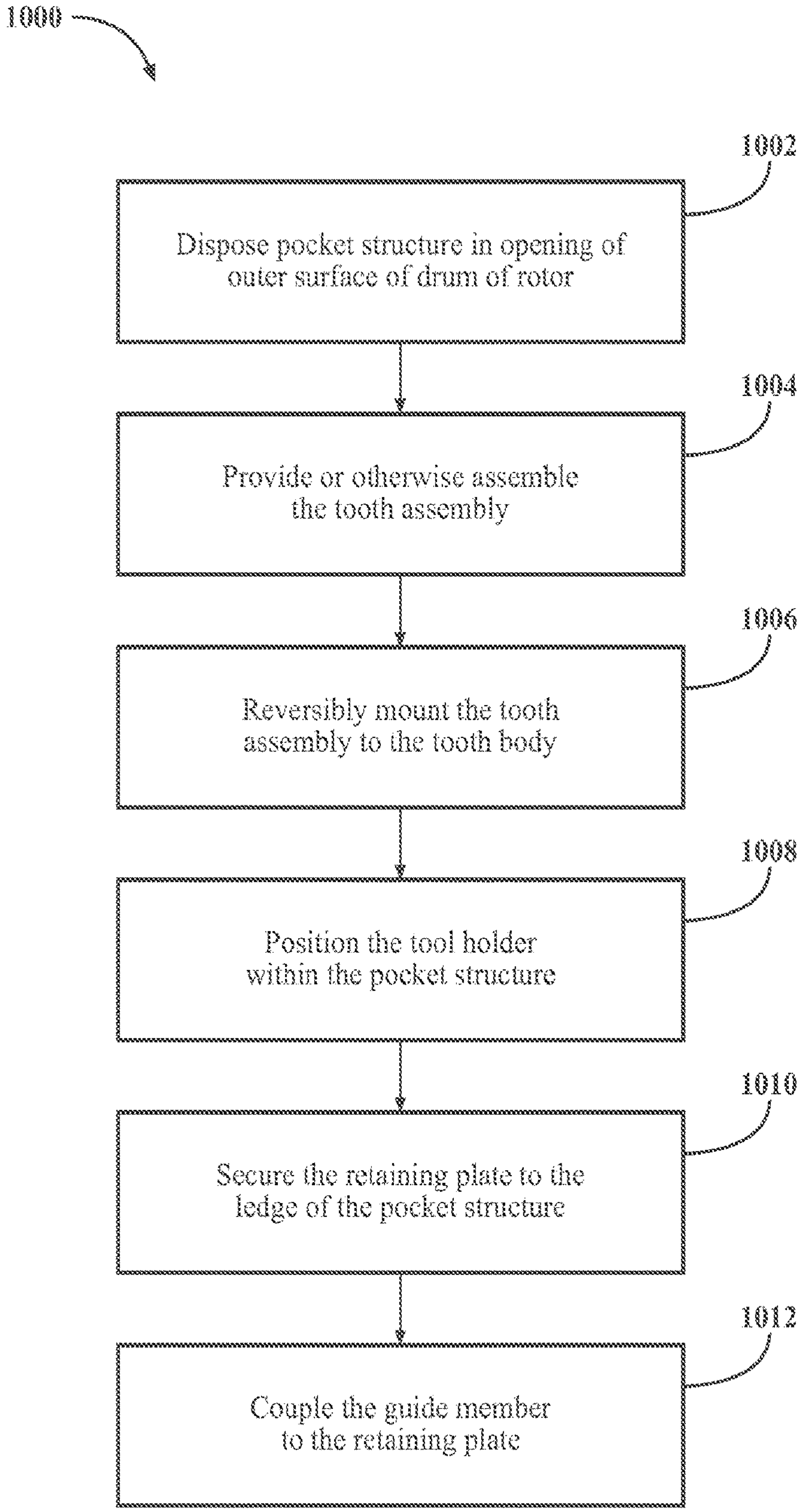
FIG. 17 is a logic flow diagram for forming a processing tool assembly on the rotor of the drum of the material reducing system according to an exemplary embodiment of the present disclosure

Referring now to FIG. 17, a method for assembling a portion of the reducing system 14, and in particular assembling the processing tool assembly 54 to the rotor 48, is provided below and illustrated in the logic flow diagram of FIG. 17. The assembly method below will be described for assembling a single processing tool assembly 54 to the rotor 48 of the material processing machine 10, but the same process can be used for each processing tool assembly 54.

Initially, the method 1000 begins in Step 1002 wherein the bucket 62 of the tool holder 56 is disposed within a respective opening 53 in the outer surface 52 of the drum 51 and rotor 48 with the ledge 72 disposed radially outward of and adjacent to the outer surface 52 of the drum 51 and rotor 48. More in particular, the outer surface of the respective bucket sides 64, 66, 68, 70 are received within the respective opening 53 in the outer surface 52 of the drum 51 and positioned adjacent to side surface portion of the drum 51 and rotor 48 extending radially inward from the opening 53. Further, the lower surface 73 of the ledge 72 is positioned around the opening 53 and seated onto the outer surface 52 of the drum 51 and rotor 48 radially outward from the outer surface 52. In the disposed position, the runners 74 extend in a direction radially outwardly away from the outer surface 52 of the drum 51 and rotor 48.

In certain embodiments, and as a part of Step 1002, the disposition of the tool holder 56 is such that the tool holder 56 is press fit within the respective opening 53, with the respective bucket sides 64, 66, 68, 70 in pressing engagement with the respective side surface portions of the drum 51 of the rotor 48. Preferably, once disposed within the opening 53, the tool holder 56 may also be affixed to the drum 51 of the rotor 48 through welding, or through the use of an adhesive, or through any other known affixing methods known in the art.

In certain embodiments, the method 1000 also includes Step 1004 wherein the tooth 180 is coupled to, and preferably mounted to, the base plate 172 to form the tooth assembly 170. In particular, the tooth 180 is positioned such that the inner mounting face 91 is positioned adjacent to the base plate 172. The tooth 180 is then coupled to the base plate 172 or mounted to the base plate 172 by welding or through the use of an adhesive or some other type of permanent mounting method, or through the use of fasteners.

In alternative embodiments, as opposed to the mounting of the tooth 180 to the base plate 172 in Step 1004, the tooth assembly 170 is provided in an assembled state as a part of Step 1004.

Next, in Step 1006, the tooth assembly 170 is mounted to the tooth holding portion 104 of the tool body 100.

In particular, the tooth assembly 170 is positioned relative to the tooth holding portion 104 such that the base plate 172 is positioned adjacent to the front side 130 of the tooth holding portion 104 with the base plate 172 disposed between the tooth holding portion 104 and the tooth 180 and with the openings 134 aligned with the corresponding respective openings 178 in the base plate 172. Next, a fastener 125 (shown in FIGS. 8 and 9 as a bolt 125) is inserted through the aligned respective openings 134, 178 and is secured by a hex nut 203 and washer 201 positioned within the opening 178 or alternatively by threads further defining the respective openings 134, 178.

Next, in Step 1008, the tool body 100 having the mounted tooth assembly 170 is positioned within the inner cavity 78 of the tool holder 56.

In particular, the tool retention portion 102 is first aligned with the inner cavity 78 and spaced from the inner cavity 78 (shown as above the inner cavity 78 for example as in FIGS. 8 and 9) such that the respective outward surfaces 112, 120, 116, 118 of the tool retention portion 102 are positioned adjacent to and above the corresponding inward surfaces 82, 90, 86, 88 of the tool holder 56 and such that the respective tabs 124, 126 are adjacent and above the corresponding slots 84, 92.

Next, the tool retention portion 102 is inserted within the inner cavity 78 by moving the tool retention portion 102 towards the bottom 71 of the tool holder 56 within the inner cavity with the respective tabs 124, 126 inserted within the corresponding slots 84, 92 (downward relative to FIGS. 8A-B and 9A-9B).

In the fully inserted state, as best shown in FIGS. 10-11 and 13-16 in certain embodiments, the tool retention portion 102 is positioned, and in certain embodiments engaged with or press fit, against the tool holder 56 within the inner cavity 78, thereby securing tool retention portion 102 to the tool holder 56 within the inner cavity 78. More in particular, in certain embodiments, the respective outward surfaces 112, 120, 116, 118 of the tool retention portion 102 are positioned adjacent to, and preferably engaged with and in abutting or press fit contact with, the corresponding inward surfaces 82, 90, 86, 88 of the tool holder 56 with the respective tabs 124, 126 slid within the corresponding slots 84, 92. As a part of this insertion, the tool retention portion 102 is positioned such that the respective outward angled surface 116, 118 of the tool retention portion 102 are engaged with or otherwise are abutting a corresponding inward angled surface of the pair of opposing bucket sides 68, 70 of the pocket structure 60 when the tool body 100 is retained within the tool holder 56. In this position, the gap 61 is present between the bottom side 111 of the tool retention portion 102 and the bottom 71 of the pocket structure 60.

In the fully inserted state, as best shown in FIGS. 13-17 in certain embodiments, and after the retaining plate 150 is secured to the tool holder 56 and is abutting a portion of the tool body 100 such that the tool retention portion 102 of the tool body 100 is retained in the tool holder 56, a gap 61 is present between the bottom side 111 of the tool retention portion 102 and the bottom 71 of the pocket structure 60. This gap 61 is confirms that the tool retention portion 102 has not bottomed out against the bottom 71 of the pocket structure 60 without obtaining a snug alignment or press fit of the tool retention portion 102 against the pocket structure 60.

Once fully inserted, the method continues with Step 1010, in which the retaining plate 150 is mounted to the ledge 72 of the tool holder 56 such that the tool body 100 is retained within the inner cavity 78 of the pocket structure 60.

In particular, the retaining plate 150 is inserted around the tooth holding portion 104 of the tool body 100 such that the central opening 164 surrounds the tooth holding portion 154 and with the bottom side 154 seated onto the upper surface 75 of the ledge 72 of the tool holder 56 and with the fastener openings 162 of the retaining plate aligned with the corresponding ledge fastener openings 76 in the ledge 72. A fastener 121, shown in the Figures as a bolt 121, is inserted through the fastener openings 162 in the retaining plate 150 and ledge fastener openings 76 in the ledge 72, thereby completing the reversible mounting of the retaining plate 150 to the tool holder 56 such that the tool retention portion 102 of the tool body 100 is retained within the inner cavity 78 of the pocket structure 60.

As a part of the retaining plate 150 being secured to the tool holder 56, the front and rear abutment surfaces 223, 225 are engaged with the lower side 154 of the retaining plate 150 with the tooth holding portion 106 extending through the central opening 164 and outside the pocket structure 60. In addition, the respective outward surfaces 112, 120, 116, 118 of the tool retention portion 102 are positioned into engaging contact with the corresponding inward surfaces 82, 90, 86, 88 of the tool holder 56 and such that the respective tabs 124, 126 disposed within the corresponding slots 84, 92 and such that the gap 61 is present between the bottom side 111 of the tool retention portion 102 and the bottom 71 of the pocket structure 60.

The method continues in Step 1012, wherein the guide member 190 is coupled to, and preferably affixed to, the retaining plate 150 and hence can be considered in an assembled state. In certain embodiments, the affixing is in the form of a weld affixing the guide member 190 to the retaining plate 150. More in particular, and as noted above, in this assembled state, the middle surface 194 of the guide member 190 is positioned adjacent to, and is preferably affixed to, the forward ramped surface 156. In addition, the inward surface 196 is positioned adjacent to the top side 152 of the retaining plate 150, while the outward surface 192 of the guide member 190 extends beyond the end of the forward ramped surface 156 of the retaining plate 150 and is positioned parallel to, and in certain embodiments in contact with, the outer surface 52 of the drum 51 and rotor 48. In addition, the end surface 198 extends generally normal from the end of the curved outer surface 197 between the curved outer surface 197 and the inward surface 196 and is spaced from the tooth 180 of the tooth assembly 170.

In certain embodiments, Step 1012 of the method occurs after Step 1010, while in other embodiments Step 1012 can occur prior to or simultaneously with Step 1010.

Several embodiments have been discussed in the foregoing description. However, the embodiments discussed herein are not intended to be exhaustive or limit the disclosure to any particular form. The terminology which has been used is intended to be in the nature of words of description rather than of limitation. Many modifications and variations are possible in light of the above teachings and the disclosure may be practiced otherwise than as specifically described.

What is claimed is:

1. A processing machine comprising:
- a rotor defining an outer surface having an opening; and
- a processing tool assembly at least partially mounted to said rotor, said processing tool assembly comprising:
  - a tool holder mounted to said outer surface of said rotor and extending within said opening of said rotor with said tool holder having a pocket structure defining an inner cavity,
  - a tool body having a tool retention portion and a tooth holding portion extending from said tool retention portion with said tool retention portion disposed within said inner cavity of said pocket structure,
  - a processing tool mounted to said tooth holding portion of said tool body, and
  - a retaining plate secured to said tool holder and abutting a portion of said tool body such that said tool retention portion of said tool body is retained within said pocket structure.

2. The processing machine of claim 1, wherein said tool retention portion of said tool body includes a front abutment surface and a rear abutment surface with said tooth holding portion extending between said front and rear abutment surfaces, and with said retaining plate engaging said front and rear abutment surfaces to retain said tool body within said tool holder.

3. The processing machine of claim 2, wherein said tool retention portion of said tool body includes an intermediate angled surface extending between said front abutment surface and said tooth holding portion.

4. The processing machine of claim 1, wherein said pocket structure of said tool holder includes a ledge having a top surface, and when said retaining plate is secured to said tool holder, an upper surface of said retaining plate is flush with said top surface of said ledge.

5. The processing machine of claim 1, wherein said pocket structure includes a bucket and a ledge extending from said bucket with said ledge secured to said outer surface of said rotor and with said bucket extending below said outer surface of said rotor.

6. The processing machine of claim 1, wherein a gap is present between said tool retention portion and a bottom of said pocket structure when said retaining plate is secured to said tool holder and is abutting said portion of said tool body such that said tool retention portion of said tool body is retained within said pocket structure.

7. The processing machine of claim 1 further comprising a guide member coupled to said retaining plate that extends over a portion of said outer surface of said rotor.

8. The processing machine of claim 5, wherein a first one of said bucket and said tool retention portion of said tool body defines a slot and wherein a second one of said bucket and said tool retention portion includes a tab, and wherein said tab is inserted within said slot when said tool retention portion is retained to said pocket structure.

9. The processing machine of claim 5, wherein said bucket includes:
- a first bucket side,
- a second bucket side,
- a pair of spaced apart connecting bucket sides each separately connecting said first bucket side to said second bucket side, and
- a bottom,
- wherein each of said pair of spaced apart connecting bucket sides include a respective inward angled surface that extends between said bottom and said ledge.

10. The processing machine of claim 9, wherein said tool retention portion includes:
- a first outward side,
- an opposing second outward side,
- a pair of opposing connecting outward sides, and
- a bottom side,
- wherein each of said pair of opposing connecting outward sides include a respective outward angled surface that extends between said bottom side and said tooth holding portion with the respective outward angle surface of the tool retention portion abutting a corresponding inward angled surface of said pair of spaced apart connecting bucket sides when said tool body is retained within said pocket structure.

11. The processing machine of claim 9, wherein at least one of said pair of spaced apart connecting bucket sides of said bucket define a slot and wherein at least one of said pair of opposing connecting outward sides of said tool retention portion include a tab with said tab retained within said slot when said tool retention portion is retained to said pocket structure.

12. The processing machine of claim 9, wherein each of said pair of connecting bucket sides of said bucket define a slot and wherein each of said pair of opposing connecting outward sides of said tool retention portion include a tab with each tab retained within a corresponding respective slot when said tool retention portion is retained to said pocket structure.

13. The processing machine of claim 1 further comprising an infeed system and a discharge system.

14. A processing tool assembly for use in a processing machine having a rotor defining an outer surface having an opening, said processing tool assembly comprising:
- a tool holder configured to be mounted to the outer surface of the rotor and extend within the opening of said rotor with said tool holder having a pocket structure defining an inner cavity,
- a tool body having a tool retention portion and a tooth holding portion extending from said tool retention portion with said tool retention portion disposed within said inner cavity of said pocket structure,
- a processing tool mounted to said tooth holding portion of said tool body, and
- a retaining plate secured to said tool holder and abutting a portion of said tool body such that said tool retention portion of said tool body is retained within said pocket structure.

15. The processing tool assembly of claim 14, wherein said tool retention portion of said tool body includes a front abutment surface and a rear abutment surface with said tooth holding portion extending between said front and rear abutment surfaces, and with said retaining plate engaging said front and rear abutment surfaces to retain said tool body within said tool holder.

16. The processing tool assembly of claim 15, wherein said tool retention portion of said tool body includes an intermediate angled surface extending between said front abutment surface and said tooth holding portion.

17. The processing tool assembly of claim 14, wherein said pocket structure of said tool holder includes a ledge having a top surface, and when said retaining plate is secured to said tool holder, an upper surface of said retaining plate is flush with said top surface of said ledge.

18. The waste processing tool assembly of claim 14, wherein said pocket structure includes a bucket and a ledge extending from said bucket with said ledge secured to said outer surface of said rotor and with said bucket extending below said outer surface of said rotor.

19. The processing tool assembly of claim 14, wherein a gap is present between said tool retention portion and a bottom of said pocket structure when said retaining plate is secured to said tool holder and is abutting said portion of said tool body such that said tool retention portion of said tool body is retained within said pocket structure.

20. The processing tool assembly of claim 14 further comprising a guide member coupled to said retaining plate that extends over a portion of said outer surface of said rotor.

21. The processing tool assembly of claim 18, wherein a first one of said bucket and said tool retention portion of said tool body defines a slot and wherein a second one of said bucket and said tool retention portion includes a tab, and wherein said tab is inserted within said slot when said tool retention portion is retained to said pocket structure.

22. The processing tool assembly of claim 18, wherein said bucket includes:

a first bucket side, a second bucket side, a pair of spaced apart connecting bucket sides each separately connecting said first bucket side to said second bucket side, and a bottom, wherein each of said pair of spaced apart connecting bucket sides include a respective inward angled surface that extends between said bottom and said ledge.

23. The processing tool assembly of claim 22, wherein said tool retention portion includes:

a first outward side, an opposing second outward side, a pair of opposing connecting outward sides, and a bottom side, wherein each of said pair of opposing connecting outward sides include a respective outward angled surface that extends between said bottom side and said tooth holding portion with the respective outward angle surface of the tool retention portion abutting a corresponding inward angled surface of said pair of spaced apart connecting bucket sides when said tool body is retained within said pocket structure.

24. The processing tool assembly of claim 22, wherein at least one of said pair of spaced apart connecting bucket sides of said bucket define a slot and wherein at least one of said pair of opposing connecting outward sides of said tool retention portion include a tab with said tab retained within said slot when said tool retention portion is retained to said pocket structure.

25. The processing tool assembly of claim 22, wherein each of said pair of connecting bucket sides of said bucket define a slot and wherein each of said pair of opposing connecting outward sides of said tool retention portion include a tab with each tab retained within a corresponding respective slot when said tool retention portion is retained to said pocket structure.

* * * * *